(12) United States Patent
Yamamoto

(10) Patent No.: US 7,992,771 B2
(45) Date of Patent: Aug. 9, 2011

(54) DOCUMENT-MANAGEMENT DEVICE AND DOCUMENT-MANAGEMENT METHOD

(75) Inventor: Yohei Yamamoto, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 894 days.

(21) Appl. No.: 11/445,386

(22) Filed: Jun. 2, 2006

(65) Prior Publication Data

US 2006/0274369 A1    Dec. 7, 2006

(30) Foreign Application Priority Data

Jun. 3, 2005 (JP) .................................. 2005-164417
May 17, 2006 (JP) .................................. 2006-138188

(51) Int. Cl.
*G06F 17/00*    (2006.01)

(52) U.S. Cl. ........ 235/375; 235/383; 235/385; 235/487; 705/1.1; 705/401; 715/229; 715/764

(58) Field of Classification Search .................. 234/375, 234/383, 385, 487; 707/100; 715/764, 229; 705/1.1, 401

See application file for complete search history.

(56) References Cited

U.S. PATENT DOCUMENTS

| | | | | |
|---|---|---|---|---|
| 6,188,766 B1 * | 2/2001 | Kocher | .......................... | 380/246 |
| 6,192,165 B1 * | 2/2001 | Irons | ........................... | 382/306 |
| 6,473,203 B1 * | 10/2002 | Hisatomi et al. | ............... | 358/403 |
| 7,081,965 B2 * | 7/2006 | Taniguchi | .................... | 358/1.15 |
| 7,231,594 B1 * | 6/2007 | Hitchcock et al. | ............. | 715/229 |
| 2001/0014895 A1 * | 8/2001 | Sappal | .......................... | 707/500 |
| 2003/0002068 A1 * | 1/2003 | Constantin et al. | ........... | 358/1.15 |
| 2003/0183685 A1 * | 10/2003 | Moore et al. | ................... | 235/379 |
| 2004/0025113 A1 * | 2/2004 | Penke et al. | ................... | 715/511 |
| 2004/0111297 A1 * | 6/2004 | Schoenberg | ...................... | 705/3 |
| 2004/0267595 A1 * | 12/2004 | Woodings et al. | ................. | 705/9 |
| 2005/0234835 A1 * | 10/2005 | Stonoha et al. | ................ | 705/401 |

FOREIGN PATENT DOCUMENTS

| | | |
|---|---|---|
| JP | 11-119597 | 4/1999 |
| JP | 2004-303223 | 10/2004 |
| JP | 2004-343564 | 12/2004 |

OTHER PUBLICATIONS

U.S. Appl. No. 11/737,455, filed Apr. 19, 2007, Yamamoto et al.

* cited by examiner

*Primary Examiner* — Daniel A Hess
*Assistant Examiner* — Ali Sharifzada
(74) *Attorney, Agent, or Firm* — Oblon, Spivak, McClelland, Maier & Neustadt, L.L.P.

(57) ABSTRACT

In a document-management device which supports a task of electronizing paper documents and registering electronic data of the documents to an existing system having a user interface provided to register electronic data, a request receiving unit receives a code assignment request from a user when a user interface screen corresponding to an electronic-data registration site of the existing system is displayed on a client. A code generating unit generates a site identifying code identifying the registration site of the existing system after the code assignment request is received. A screen generating unit generates a screen containing an image of the site identifying code, the screen provided for the user to print an automatic registration request page which is scanned simultaneously with scanning of the paper documents.

19 Claims, 43 Drawing Sheets

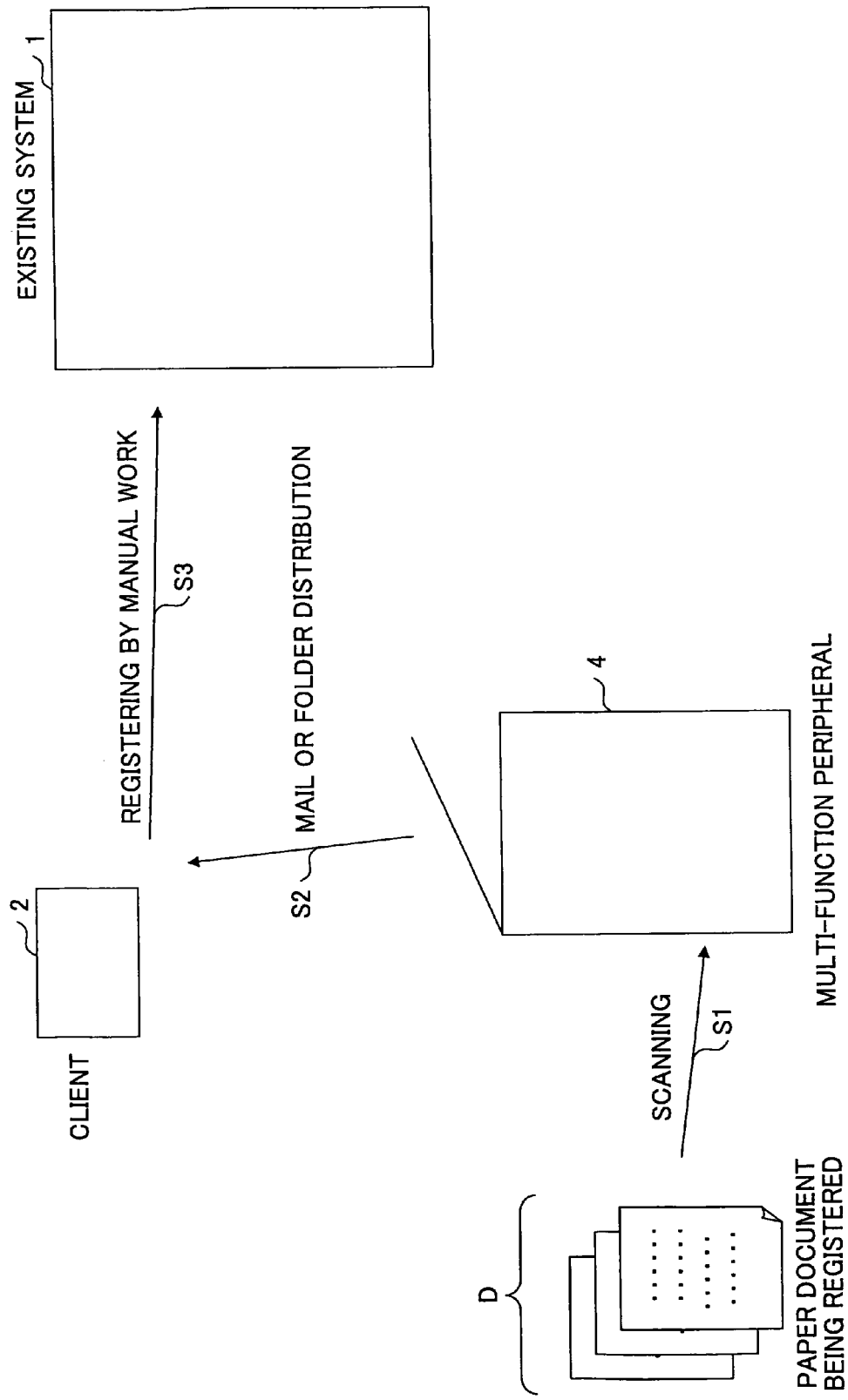

FIG.2

—REGISTRATION OF SCHEDULE—
FILE (F) EDIT (E) DISPLAY (V) MOVE (G) BOOKMARK (B) TOOL (T) HELP (H)  del.incio.us()

[BACK]   [SUB-WINDOW] [HELP]

REGISTRATION OF SCHEDULE

OK

| | |
|---|---|
| START DAY/TIME | 2006 ▽YEAR  5 ▽MONTH  8 ▽DAY  --TIME▽  --MINUTE▽ |
| END DAY/TIME | 2006 ▽YEAR  5 ▽MONTH  8 ▽DAY  --TIME▽  --MINUTE▽ |
| SCHEDULE | SELECT ▽  MEETING |
| PLACE | SELECT ▽ |
| FACILITY | SELECT |
| CONTENT | |
| OPTION | ☐ AAA   ☐ BBB   ☐ CCC<br>☐ DDD   ☐ EEE   ☐ FFF<br>⊗ GGG    △        ♂ |
| COLOR | ⊙ ○ ⊞ ○ ▦ ○ ⊘ |
| REGISTRATION | SELECT  YAMAMOTO |
| PERSON | YAMAMOTO |
| ATTACHED FILE | ATTACHED (NONE) |
| REGULAR SCHEDULE | ▽ SELECT▽ |
| SEARCH: | ⊙ SEARCH NEXT(N)  ⊗ SEARCH BACK(P)  ☐ ALL HIGHLIGHT(A)  ☐ UPPER/LOWER CASE(C) |

FIG.14A javascript:location.href='http://server/code?url='
+encodeURIComponent(location.href)

FIG.14B

GET /code?url=<u>http://originalserver/content.html</u> HTTP/1.1
                        ORIGINAL URL

FIG.15A

```
GET /content.html HTTP/1.1
```

FIG.15B

```
HTTP/1.1 200 OK
Content-Type: text/html
Content-Length: xxx

<html>
<head><title>sample document</title></head>
<body>
<h1>sample document</h1>
<a href="test1.doc">view detail</a>
</body>
</html>
```

FIG.15C

```
<html>
<head><title>sample document</title></head>
<body>
<h1>sample document</h1>
<a href="test1.doc">view detail</a>
<div style="position:absolute; left:0px; top:0px;">
  <img src="http://server/qrcode?v=123456" />
</div>
</body>
</html>
```

| ID | Original URL |
|---|---|
| 123456 | http://originalserver/content.html |
| ⋮ | ⋮ |

```
GET /qrcode?v=123456 HTTP/1.1
```

```
HTTP/1.1 200 OK
Content-Type: image/png
Content-Length: xxx

BINARY IMAGE DATA BY QR ENCODING OF "123456"
```

FIG.18

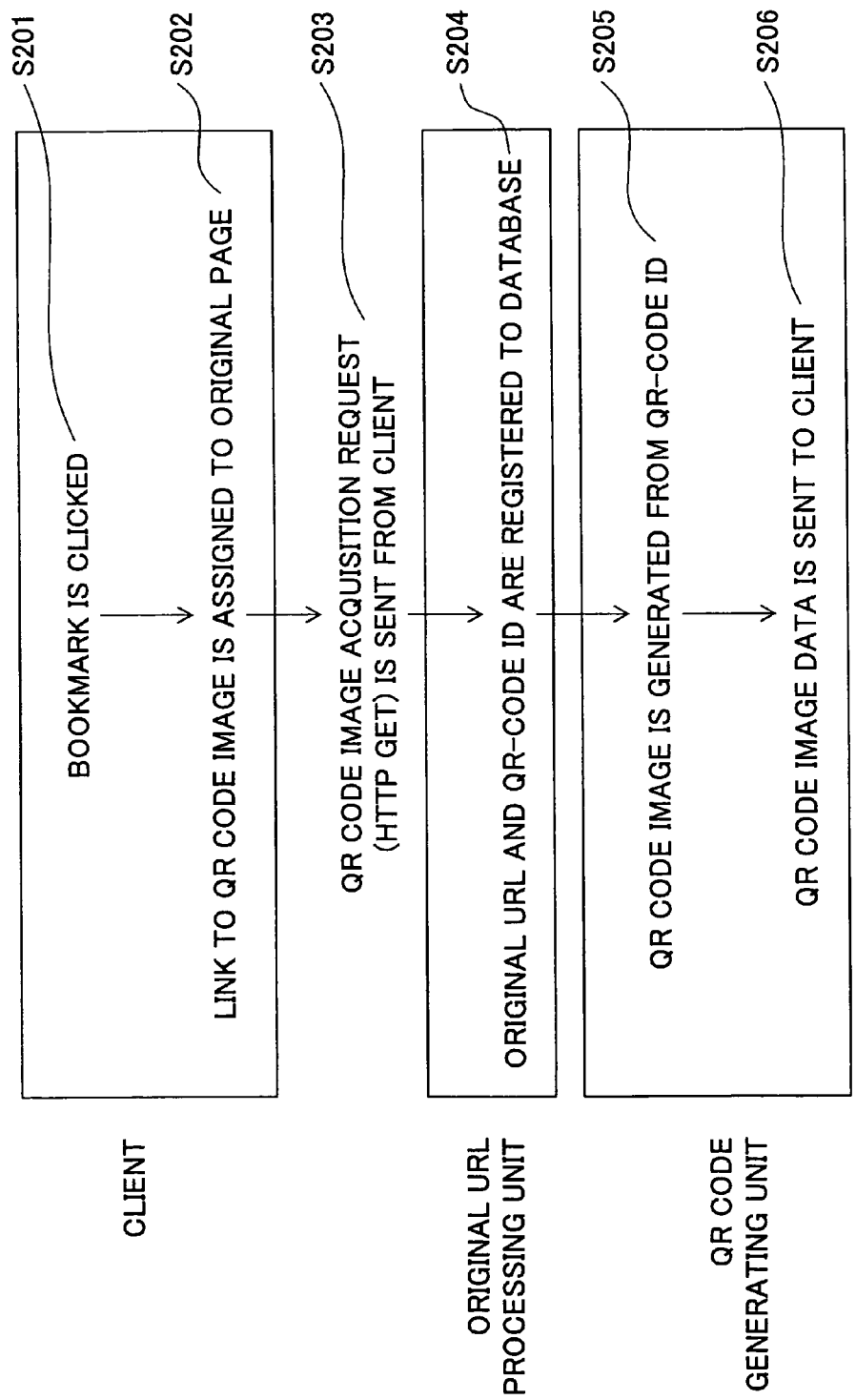

FIG.20A javascript:(function(){var
img=document.createElement('img');img.setAttribute('style','display:block;po
sition:absolute;left:0px;top:0px;');img.setAttribute('src',
'http://server/qrcode?v='+encodeURIComponent(location.href));docum
ent.getElementsByTagName('body')[0].appendChild(img);})();

FIG.20B (function(){
// "img" ELEMENT FOR DISPLAYING IMAGE IS CREATED
var img=document.createElement('img');
// "style" ATTRIBUTE IS SET TO DEFINE IMAGE-DISPLAY START POSITION
img.setAttribute('style',
    'display:block; position:absolute; left:0px; top:0px;');
//URL OF IMAGE BEING DISPLAYED IS DESIGNATED
img.setAttribute('src', 'http://server/qrcode?v=' +
    encodeURIComponent(location.href));
// "img" ELEMENT IS ADDED
document.getElementsByTagName('body')[0].appendChild(img);
})();

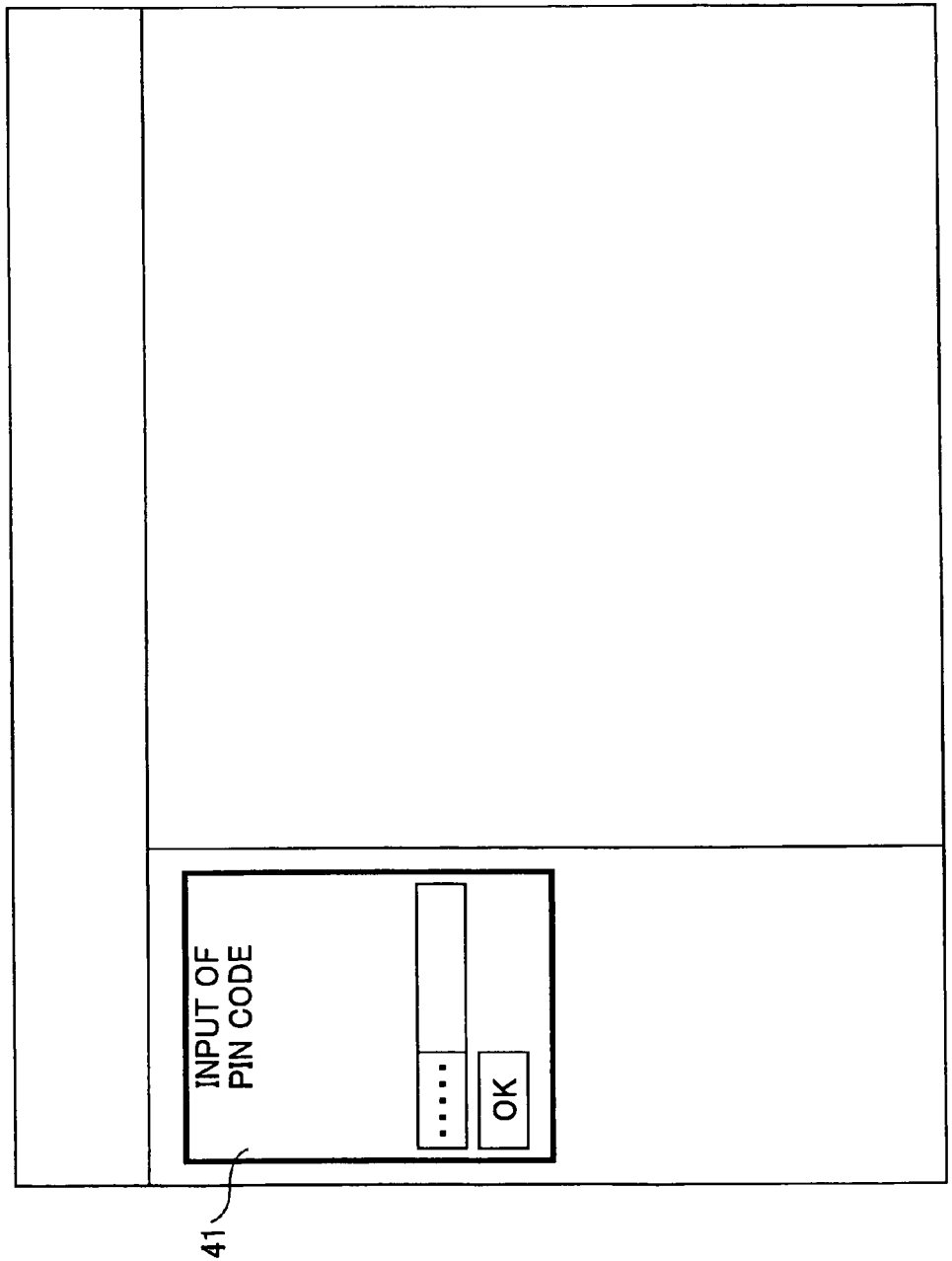

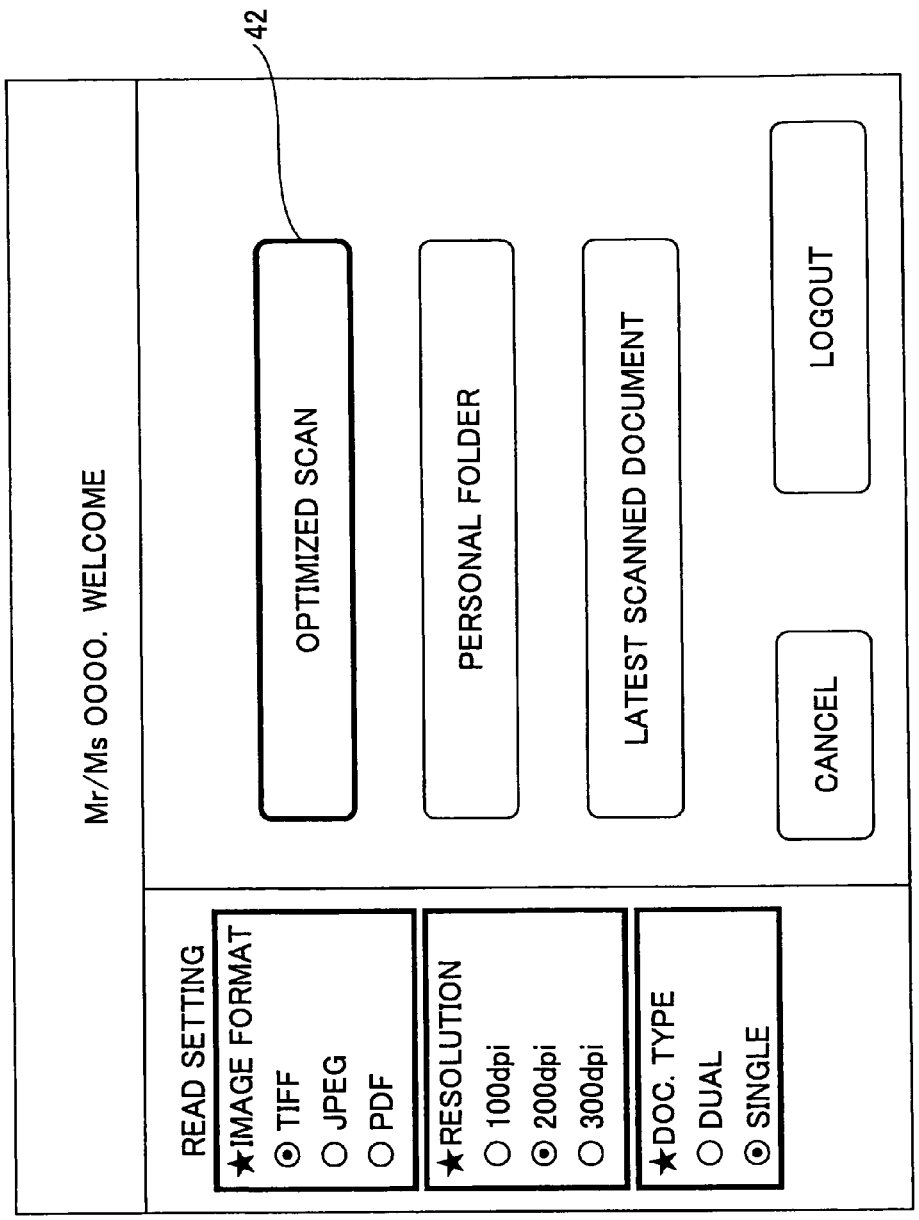

FIG.27

```
POST /content.html HTTP/1.1
Host: originalserver
Content-Type: multipart/form-data; boundary=---------------2165623557890 0
Content-Length: xxx -----------------2165623557890 0
Content-Disposition: form-data; name="id"

123456
-----------------2165623557890 0
Content-Disposition: form-data; name="attach"; filename="test.doc"
Content-Type: application/octet-stream (BINARY IMAGE DATA IN WHICH COVER PAGE IS DELETED)
-----------------2165623557890 0--
```

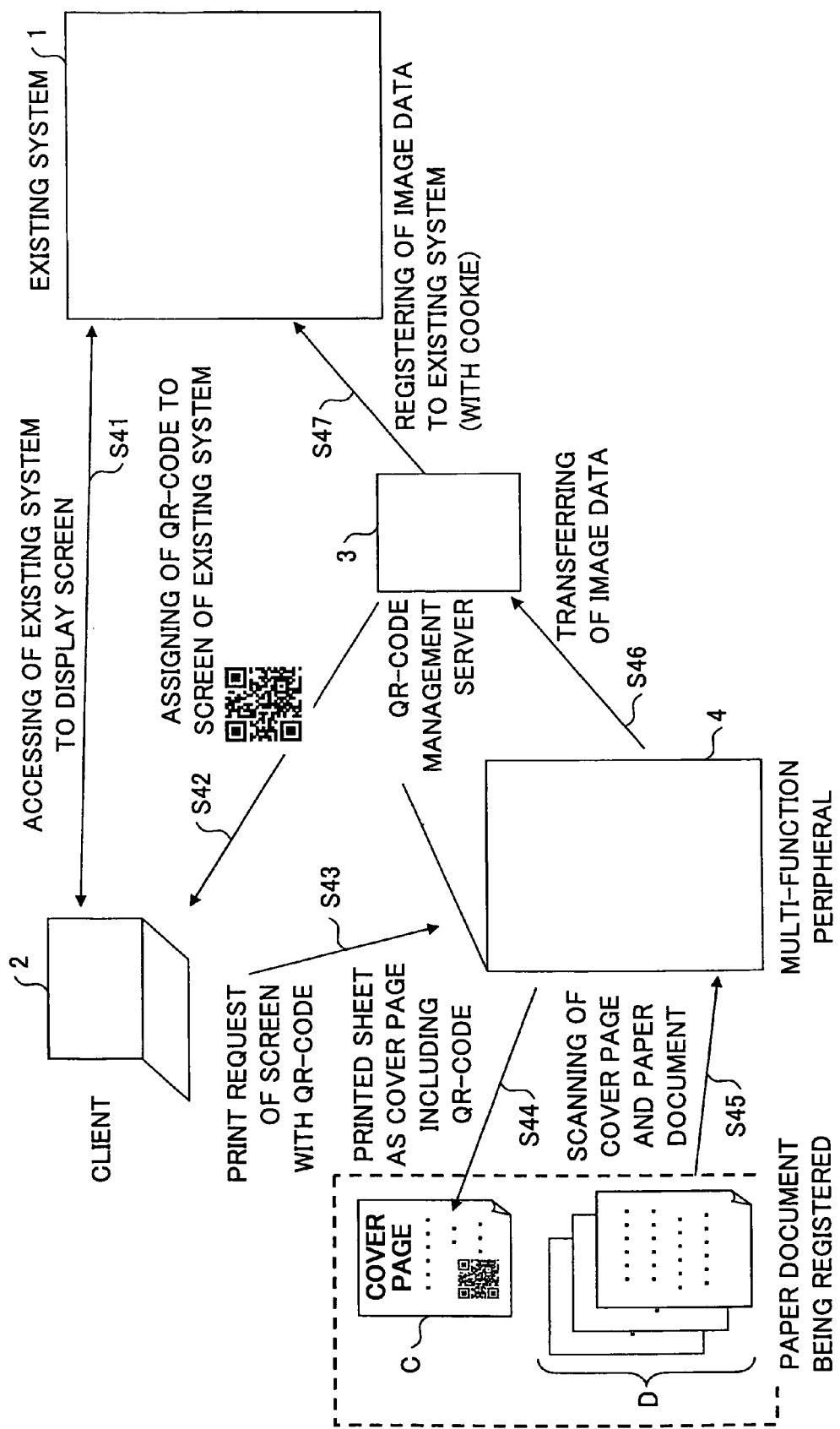

FIG.29A

```
javascript:location.href='http://server/code?url='
   +encodeURIComponent(location.href)
   +'&cookie='
   +encodeURIComponent(document.cookie)
```

FIG.29B

| ID | Cookie | Original URL |
|---|---|---|
| 123456 | TF%60LPFZF%40ClLPFdLRFGCF%40ClMXFIC | http://server/cgi-bin/schedule?id=abc123 |
| ... | ... | ... |

```
POST /content.html HTTP/1.1
Host: originalserver
Content-Type: multipart/form-data; boundary=---------------------------2165623557890 0
Content-Length: xxx
Cookie: TF%60LPFZF%40CILPFdLRFGCF%40CIMXFIC
-----------------------------2165623557890 0
Content-Disposition: form-data; name="id"

123456
-----------------------------2165623557890 0
Content-Disposition: form-data; name="attach"; filename="test.doc"
Content-Type: application/octet-stream (BINARY IMAGE DATA IN WHICH COVER PAGE IS DELETED)
-----------------------------2165623557890 0--
```

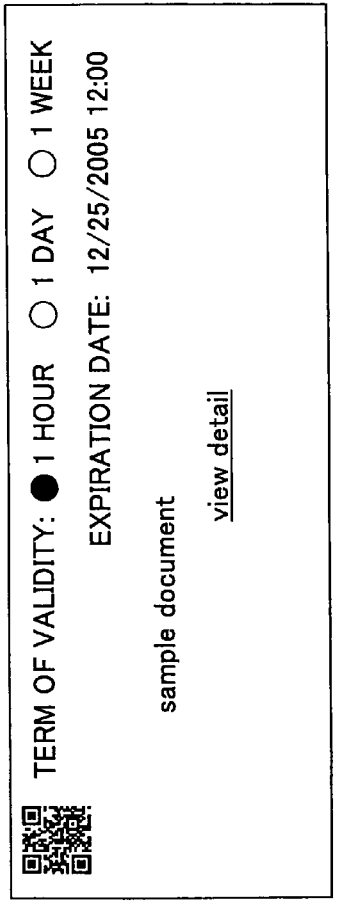

TERM OF VALIDITY: ● 1 HOUR  ○ 1 DAY  ○ 1 WEEK

EXPIRATION DATE: 12/25/2005 12:00 sample document view detail

FIG. 32B

```
<input type="radio" checked onselect="change(3600000)"> 1 HOUR
<input type="radio" onselect="change(86400000)"> 1 DAYA
<input type="radio" onselect="change(67929088)"> 1 WEEK
<script type="text/javascript">
function change(msec) {
  var d = new Date();
  d.setTime(d.getTime() + msec);
  location.href=location.href + '&id=123456&min=' + d.getTime();
}
</script>
```

FIG. 32C

| ID | expireDate | Original URL |
|---|---|---|
| 123456 | 2005-10-11T22:33:33 | http://server/cgi-bin/schedule?id=abc123 |
| ... | ... | ... |

34

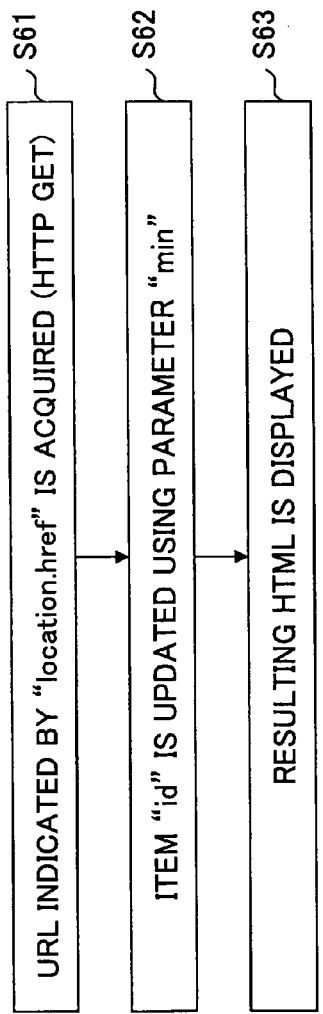

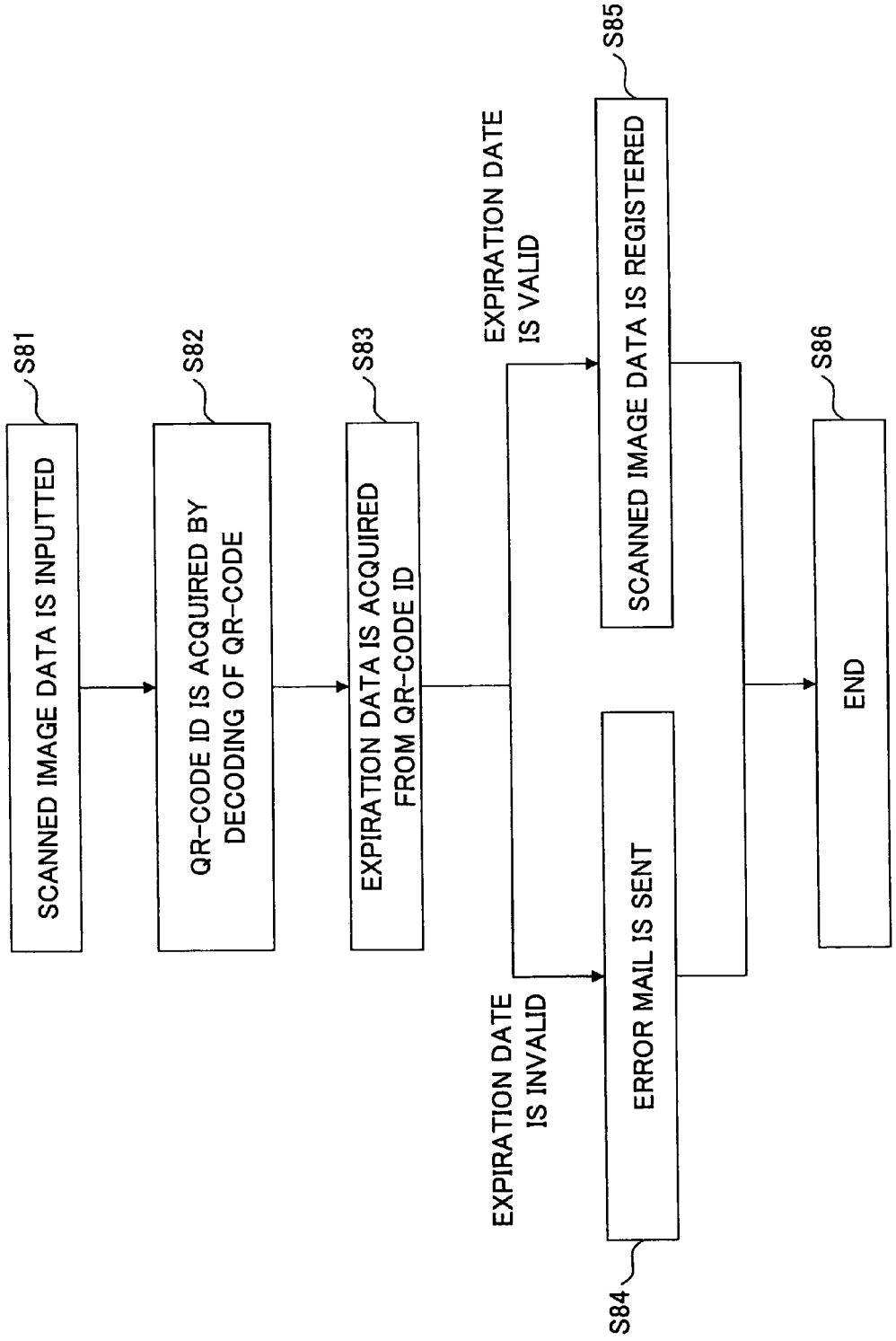

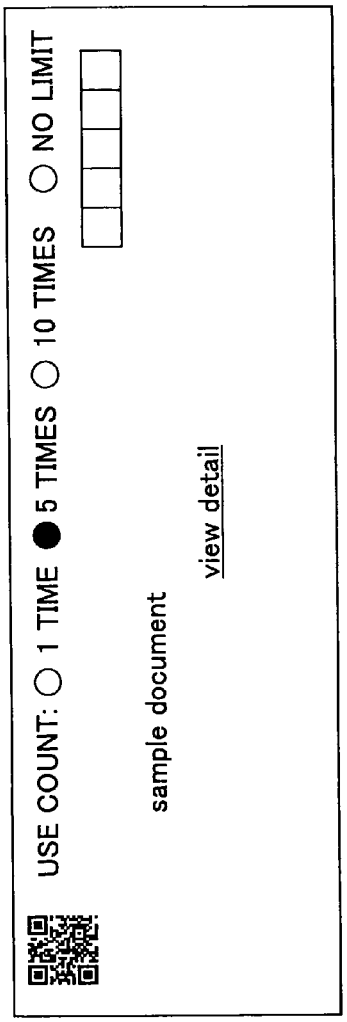

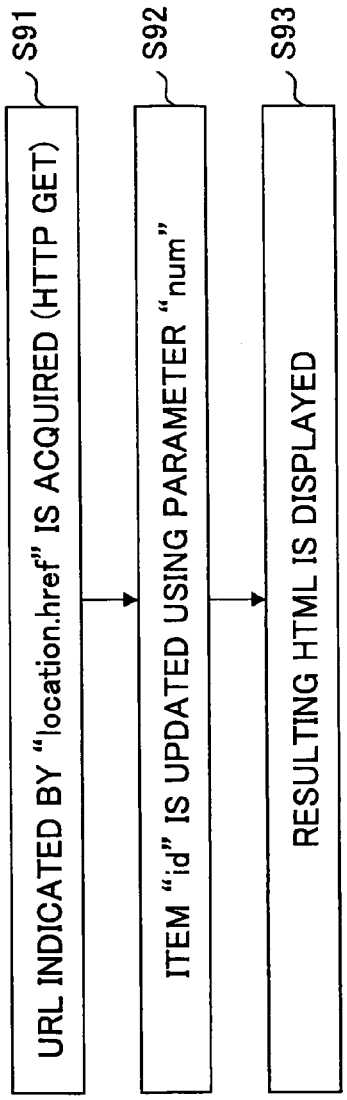

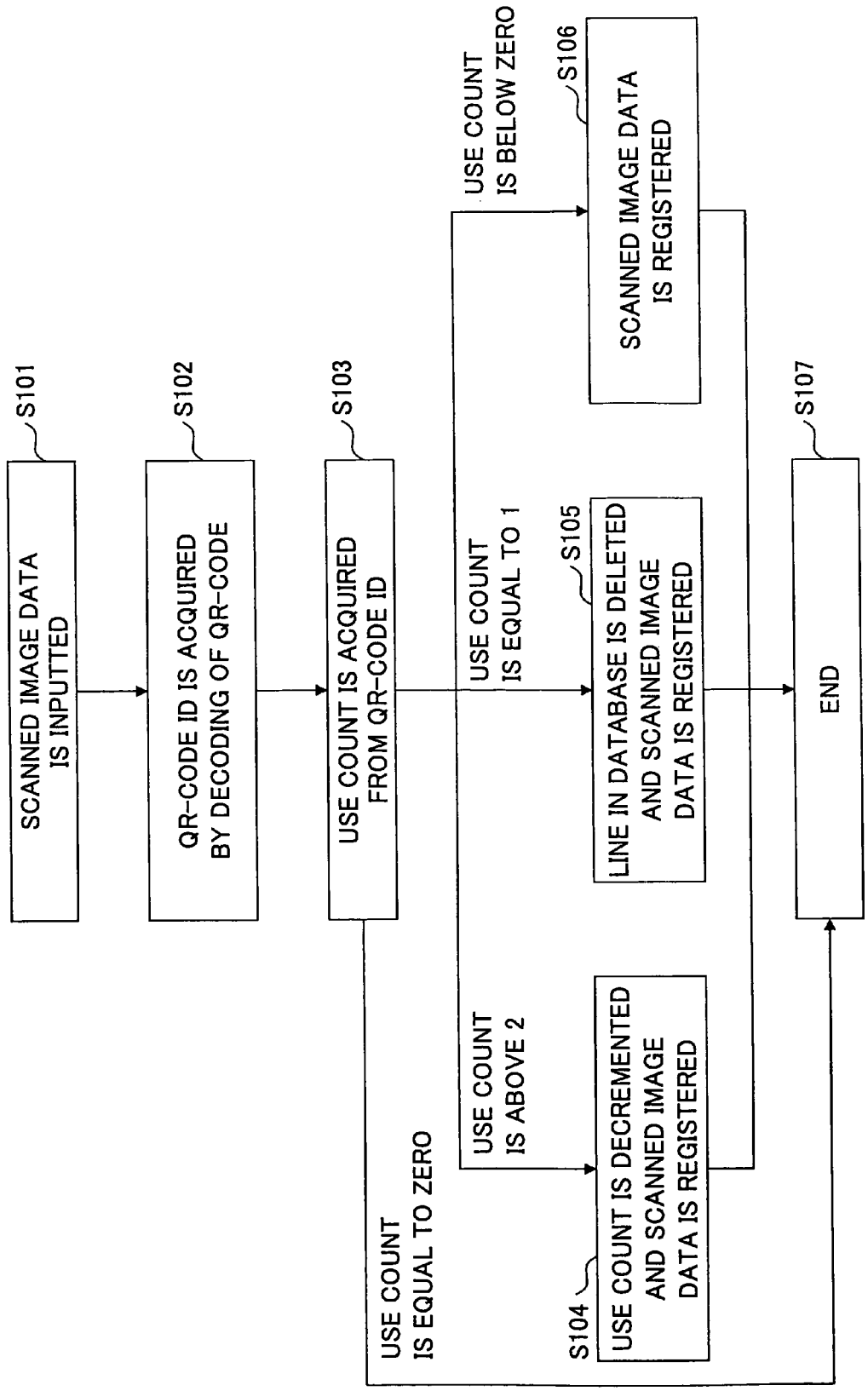

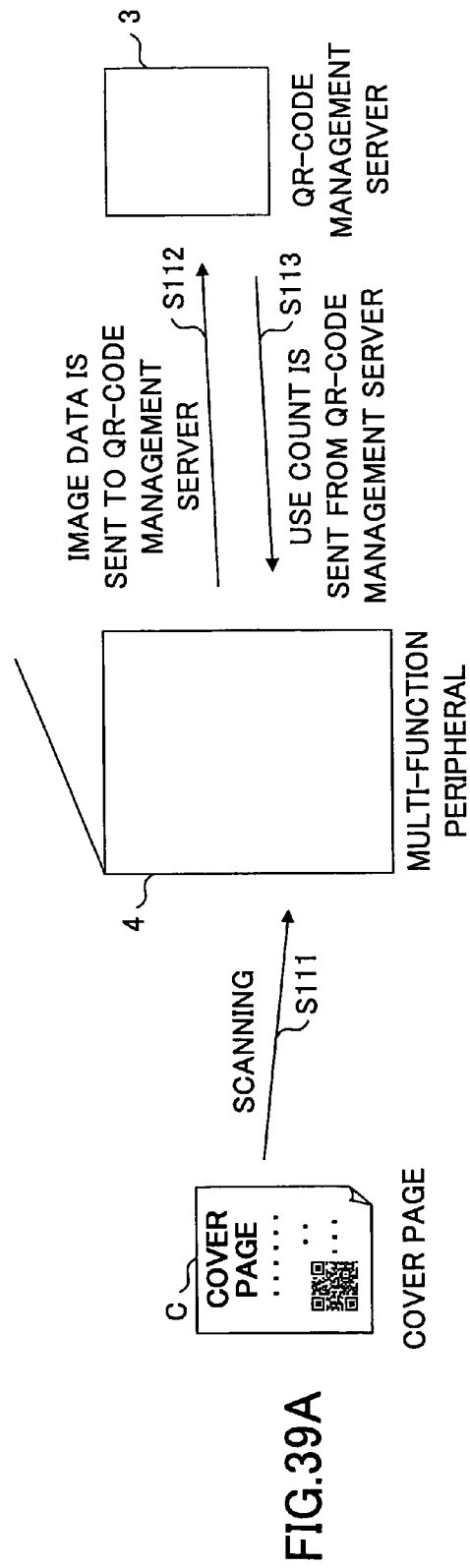
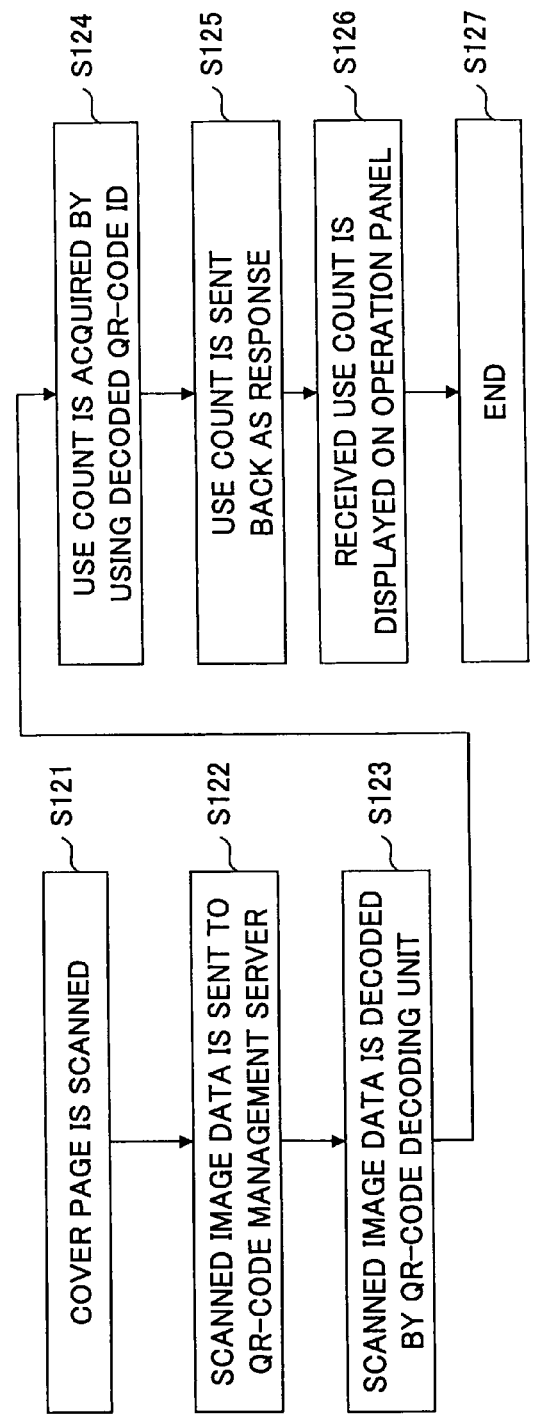
FIG.39A
FIG.39B

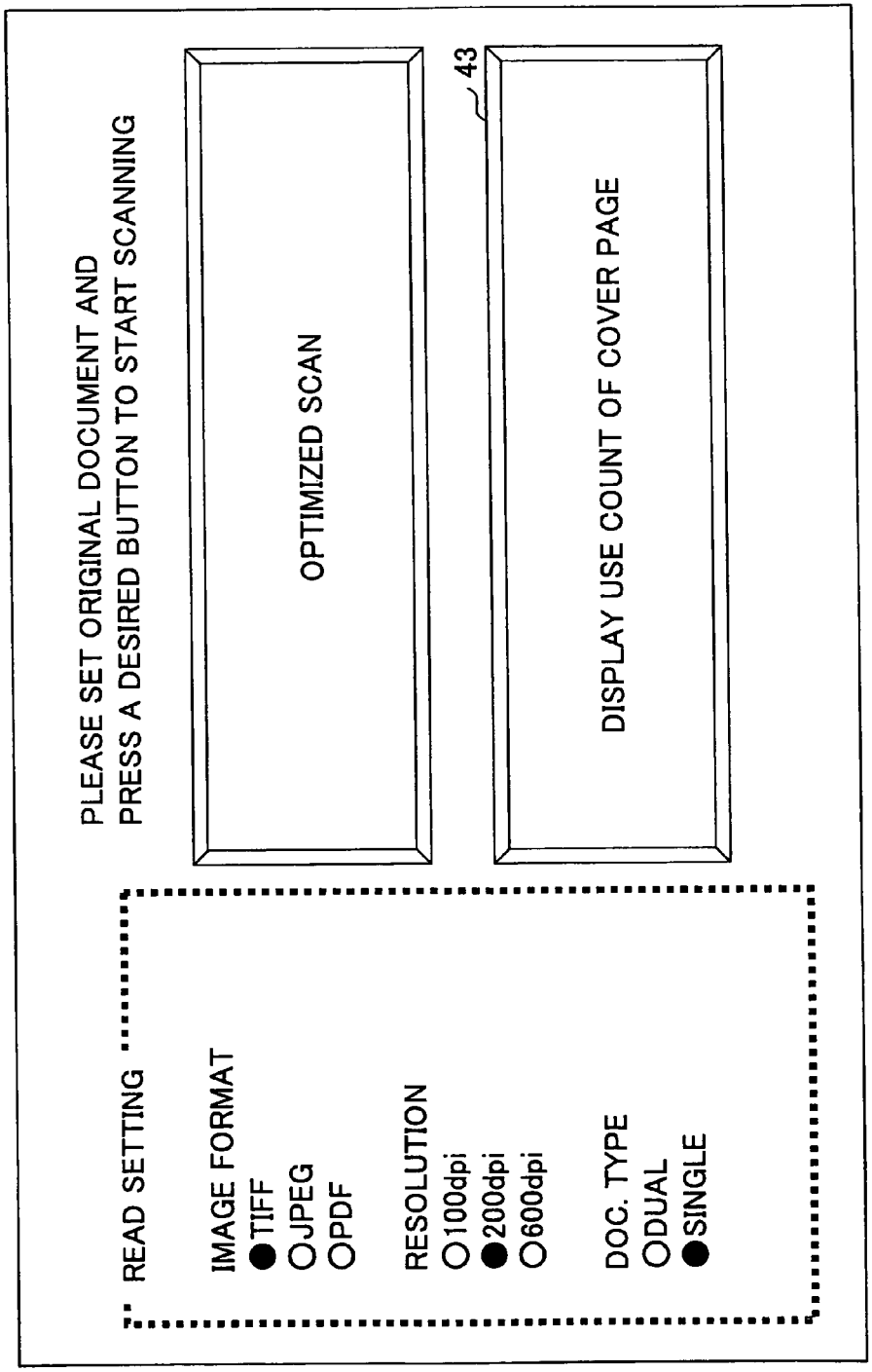

FIG.41A

```
POST /getnum HTTP/1.1
Host: barcodeserver
Content-Type: image/tiff
Content-Length: xxx

IMAGE DATA OF COVER PAGE
```

FIG.41B

```
HTTP/1.1 200 OK
Content-Type: text/plain
Content-Length: 1

```
Select num from table where id=123456
``` ns
DOCUMENT-MANAGEMENT DEVICE AND DOCUMENT-MANAGEMENT METHOD

BACKGROUND OF THE INVENTION

1. Field of the Invention

The present invention relates to a document-management device and a document-management method which are adapted for supporting the task of electronizing paper documents and registering electronic data of the documents to an existing system.

2. Description of the Related Art

While the electronization of documents in offices and the sharing of electronic document data are penetrating, the registration of electronic data of documents for meetings or the like in conference management systems or the like as the attached copies is commonly performed.

The electronic document data created by a personal computer or acquired in the form of electronic data may be easily registered in the conference management systems. However, in the case of paper documents the data of which is only described on paper, they must be electronized with a scanner manually before registering them in the conference management systems.

FIG. 1 shows a conventional procedure of electronization and registering of paper documents to an existing system.

As shown in FIG. 1, the user scans and electronizes paper documents D, which are to be registered to an existing system 1, such as a conference management system, by using a multi-function peripheral 4 having the functions of a scanner and a printer (step S1). And the user carries out an e-mail distribution (scan to mail) from the multi-function peripheral 4 to the user or a folder distribution (scan to folder) from the multi-function peripheral 4 to a predetermined folder of the user (step S2).

Subsequently, the user checks the e-mail addressed to the user, or the electronic data of the paper documents D transmitted to the predetermined folder, on the client 2 which is operated by the user. After this, the user accesses the existing system 1 and manually registers the electronic data of the paper documents D in the screen of the corresponding conference of the existing system 1 (step S3).

FIG. 2, FIG. 3 and FIG. 4 show examples of user interfaces of the electronic data registration to the existing system 1. Suppose that the screen of the registration site is displayed on the personal computer as in FIG. 2 through FIG. 4. In the example of FIG. 2, if the attached file button 11 is clicked with the mouse, the electronic data is attached to the e-mail. In the example of FIG. 3, the search button and the add button indicated in the area 12 are displayed, and if the search button is clicked to specify the file and the add button is clicked, the electronic data is attached to the e-mail. In the example of FIG. 4, the condition in which the electronic data of the "planning.tif" file is attached to the e-mail is displayed in the area 13.

As described above, when the paper documents are electronized and registered to the existing system, the conventional method requires that the electronic data of the paper documents scanned be manually registered in the existing system, and there is a problem that the handling becomes complicated.

In the meantime, Japanese Laid-Open Patent Applications No. 11-119597 and No. 2004-343564 disclose a document-management method in which a bar code is assigned to a portion of a document being copied by a copying device or being transmitted by a facsimile device, and the setting of copy conditions or fax transmission destination by the user is easily carried out by reading the content of the bar code assigned.

Japanese Laid-Open Patent Application No. 2004-303223 discloses a document-management method by which a bar code printed in a document is extracted.

However, neither of the above-mentioned document-management methods supports the task of electronizing paper documents and registering the electronic data of the documents to the existing system. Thus, it is difficult for the above-mentioned document-management methods to eliminate or solve the above-mentioned problem.

SUMMARY OF THE INVENTION

According to one aspect of the invention, there is provided an improved document-management device and method in which the above-described problems are eliminated.

According to one aspect of the invention there is provided one of a document-management device and a document-management method which are adapted to efficiently support the task of electronizing paper documents and registering the electronic data of the documents to an existing system, and contribute to laborsaving.

In an embodiment of the invention which solves or reduces one or more of the above-mentioned problems, there is provided a document-management device which supports a task of electronizing paper documents and registering electronic data of the documents to an existing system having a user interface provided to register electronic data, the device comprising: a request receiving unit receiving a code assignment request from a user when a user interface screen corresponding to an electronic-data registration site of the existing system is displayed on a client; a code generating unit generating a site identifying code identifying the registration site of the existing system after the code assignment request is received; and a screen generating unit generating a screen containing an image of the site identifying code, the screen provided for the user to print an automatic registration request page which is scanned simultaneously with scanning of the paper documents.

The above-mentioned document-management device may be configured so that the screen generating unit generates the screen in which the image of the site identifying code is superimposed on the user interface screen corresponding to the registration site of the existing system.

The above-mentioned document-management device may be configured so that the request receiving unit is provided to transmit the code assignment request to a code management server, and the screen generating unit is provided to transmit to the client a processed HTML in which a link to the image of the site identifying code is contained in a HTML of the user interface screen of the existing system.

The above-mentioned document-management device may be configured so that the request receiving unit and the screen generating unit use a bookmarklet registered in a Web browser of the client as a bookmark in the user interface screen, and when the bookmark is clicked a link to the image of the site identifying code is contained in a HTML of the user interface screen.

The above-mentioned document-management device may be configured so that the code generating unit is provided to generate, when a code image acquisition request is received from the client, the image of the site identifying code and transmit the image to the client.

The above-mentioned document-management device may be configured so that the site identifying code is managed in a database in which an ID of the site identifying codes and a site locator of the user interface screen are associated and registered.

The above-mentioned document-management device may be configured so that the request receiving unit is provided to receive cookie information of the user interface screen which is used as authentication information of the existing system.

The above-mentioned document-management device may be configured so that the cookie information is managed in a database in which an ID of the site identifying code, a site locator of the user interface screen, and the cookie information are associated and registered.

The above-mentioned document-management device may be configured so that the screen generating unit is provided to generate a processed HTML in which a link to the image of the site identifying code, a description of a button for selecting an expiration date for the request page, and a description of transmitting of a selected expiration date are contained in a HTML of the user interface screen of the existing system.

The above-mentioned document-management device may be configured so that the expiration date is managed in a database in which an ID of the site identifying code, the expiration date, and a site locator of the user interface screen are associated and registered.

The above-mentioned document-management device may be configured so that the screen generating unit is provided to generate a processed HTML in which a link to the image of the site identifying code, a description of a button for selecting a use count for the request page, and a description of transmitting of a selected use count are contained in a HTML of the user interface screen of the existing system.

The above-mentioned document-management device may be configured so that the use count is managed in a database in which an ID of the site identifying code, the use count, and a site locator of the user interface screen are associated and registered.

The above-mentioned document-management device may be configured so that the code generating unit and the screen generating unit are provided in a server which is arranged separately from the client and the existing system.

The above-mentioned document-management device may be configured so that the code generating unit and the screen generating unit are provided in a multi-function peripheral having scanner and printer functions.

The above-mentioned document-management device may be configured so that the code generating unit and the screen generating unit are provided in the existing system.

The above-mentioned document-management device may be configured so that the database, the code generating unit, and the screen generating unit are provided in a server which is arranged separately from the client and the existing system.

The above-mentioned document-management device may be configured so that the database, the code generating unit, and the screen generating unit are provided in a multi-function peripheral having scanner and printer functions.

The above-mentioned document-management device may be configured so that the database, the code generating unit, and the screen generating unit are provided in the existing system.

The above-mentioned document-management device may be configured so that the database is provided in a server which is arranged separately from the client and the existing system.

In an embodiment of the invention which solves or reduces one or more of the above-mentioned problems, there is provided a document-management method document-management method which supports a task of electronizing paper documents and registering electronic data of the documents to an existing system having a user interface provided to register electronic data, the method comprising: receiving a code assignment request from a user when a user interface screen corresponding to an electronic-data registration site of the existing system is displayed on a client; generating a site identifying code identifying the registration site of the existing system after the code assignment request is received; and generating a screen containing an image of the site identifying code, the screen provided for the user to print an automatic registration request page which is scanned simultaneously with scanning of the paper documents.

According to embodiments of the document-management device and the document-management method of the invention, it is possible to efficiently support the task of electronizing paper documents and registering the electronic data of the documents to the existing system, and it is possible to contribute to laborsaving.

BRIEF DESCRIPTION OF THE DRAWINGS

Other objects, features and advantages of the present invention will be apparent from the following detailed description when reading in conjunction with the accompanying drawings.

FIG. 1 is a diagram showing the conventional procedure of electronization and registration of paper documents to an existing system.

FIG. 2 is a diagram showing an example of a user interface of the electronic data registration to the existing system.

FIG. 13 is a diagram showing an example of the user interface which transmits a QR code assignment request.

FIG. 14A and FIG. 14B are diagrams showing an example of the bookmarklet for transmitting the QR code assignment request, and an example of the HTTP request generated.

FIG. 15A, FIG. 15B and FIG. 15C are diagrams showing an example of the acquisition of original HTML, and the assignment of a link to the QR code image.

FIG. 18 is a diagram showing an example of the screen in which the QR code image is superimposed.

FIG. 19 is a diagram showing the other processing of the QR code assignment.

FIG. 20A and FIG. 20B are diagrams showing an example of the bookmarklet.

FIG. 21 is a diagram showing an example of the authentication screen at the time of starting of operation of the multi-function peripheral.

FIG. 22 is a diagram showing an example of the user interface for starting a scan operation.

FIG. 27 is a diagram showing an example of the registration of the image data to the existing system.

FIG. 28 is a diagram for explaining the procedure of the electronization of paper documents and the registration to the existing system when authentication is required for the use of the existing system.

FIG. 29A and FIG. 29B are diagrams showing an example of the bookmarklet for acquiring the authentication information, and an example of the database.

FIG. 31 is a diagram showing an example of the registration of the image data to the existing system.

FIG. 32A, FIG. 32B and FIG. 32C are diagrams showing an example of the screen in the case of setting up the term of validity of the cover sheet to which the QR code image is assigned, an example of the HTML, and an example of the database.

FIG. 33A, FIG. 33B and FIG. 33C are diagrams for explaining the processing of setting up of the term of validity, an example of the HTTP request, and an example of the database updating.

FIG. 35 is a diagram for explaining the processing of determination as to the term of validity at the time of image-data registration.

FIG. 36A, FIG. 36B and FIG. 36C are diagrams showing an example of the screen in the case of setting up the use count of the cover page to which the QR code image is assigned, an example of the HTML, and an example of the database.

FIG. 37A, FIG. 37B and FIG. 37C are diagrams for explaining the processing of setting up of the use count, an example of the HTTP request, and an example of the database updating.

FIG. 38 is a diagram for explaining the processing of determination as to the use count.

FIG. 39A and FIG. 39B are diagrams for explaining of the processing of acquisition of the use count, and the processing of displaying the user count.

FIG. 40 is a diagram showing an example of the user interface in which the display of the use count is requested by the user.

FIG. 41A, FIG. 41B and FIG. 41C are diagrams showing an example of the HTTP request of acquisition of the use count.

DETAILED DESCRIPTION OF PREFERRED EMBODIMENTS

A description will now be given of embodiments of the invention with reference to the accompanying drawings.

<Fundamental Procedure>

Figure 3:
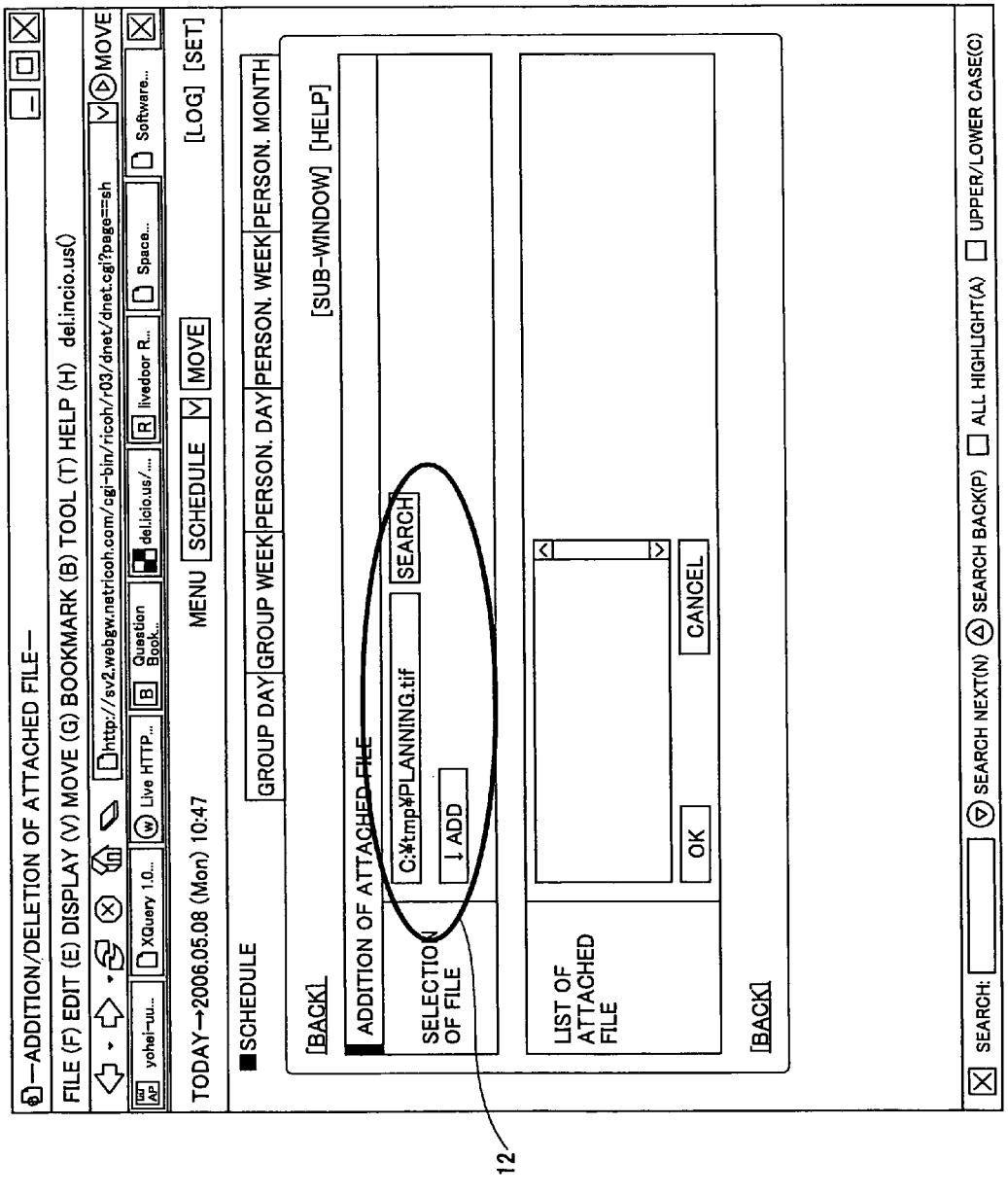
FIG. 3 is a diagram showing an example of the user interface of the electronic data registration to the existing system.
Figure 4:
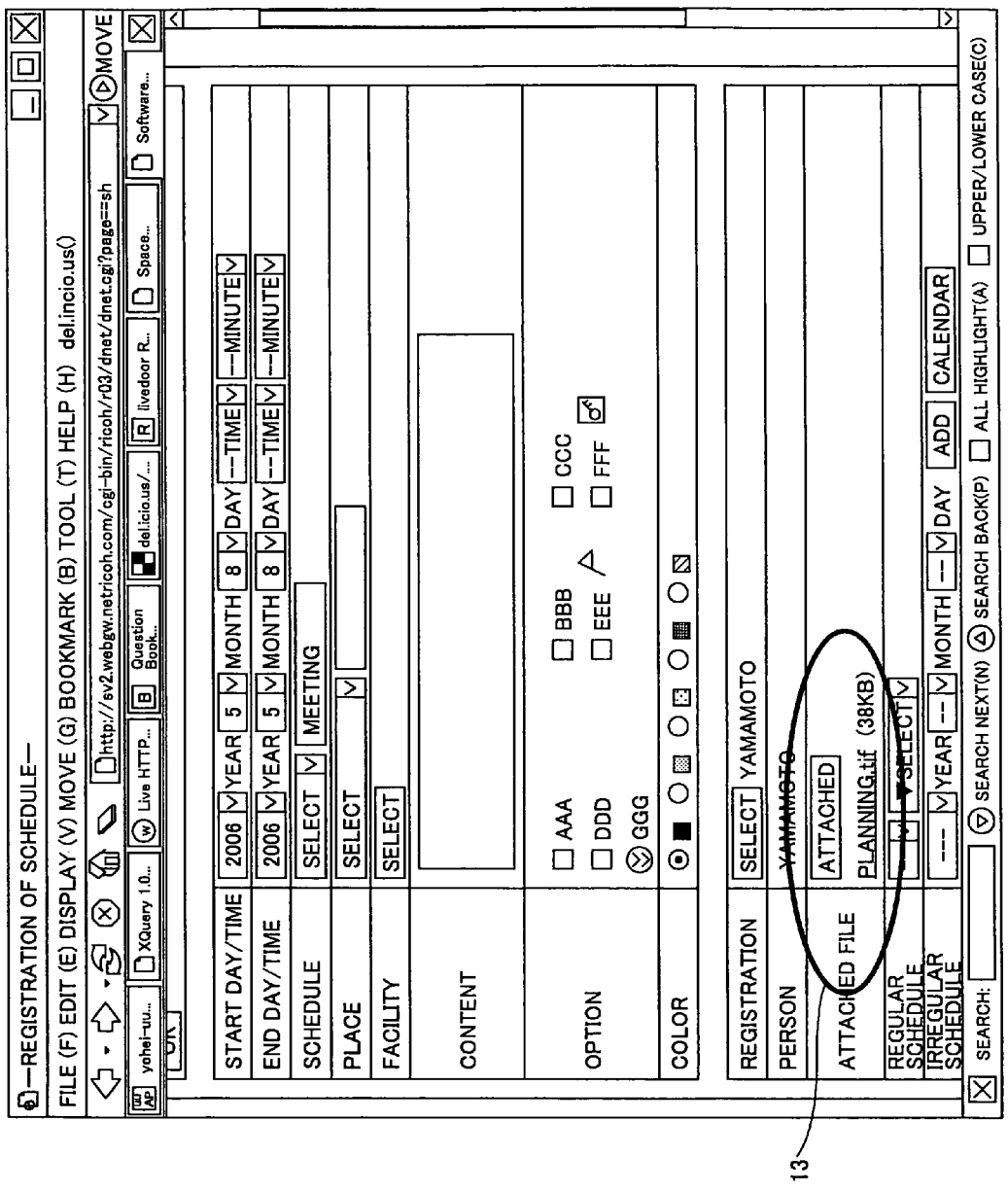
FIG. 4 is a diagram showing an example of the user interface of the electronic data registration to the existing system.
Figure 5:
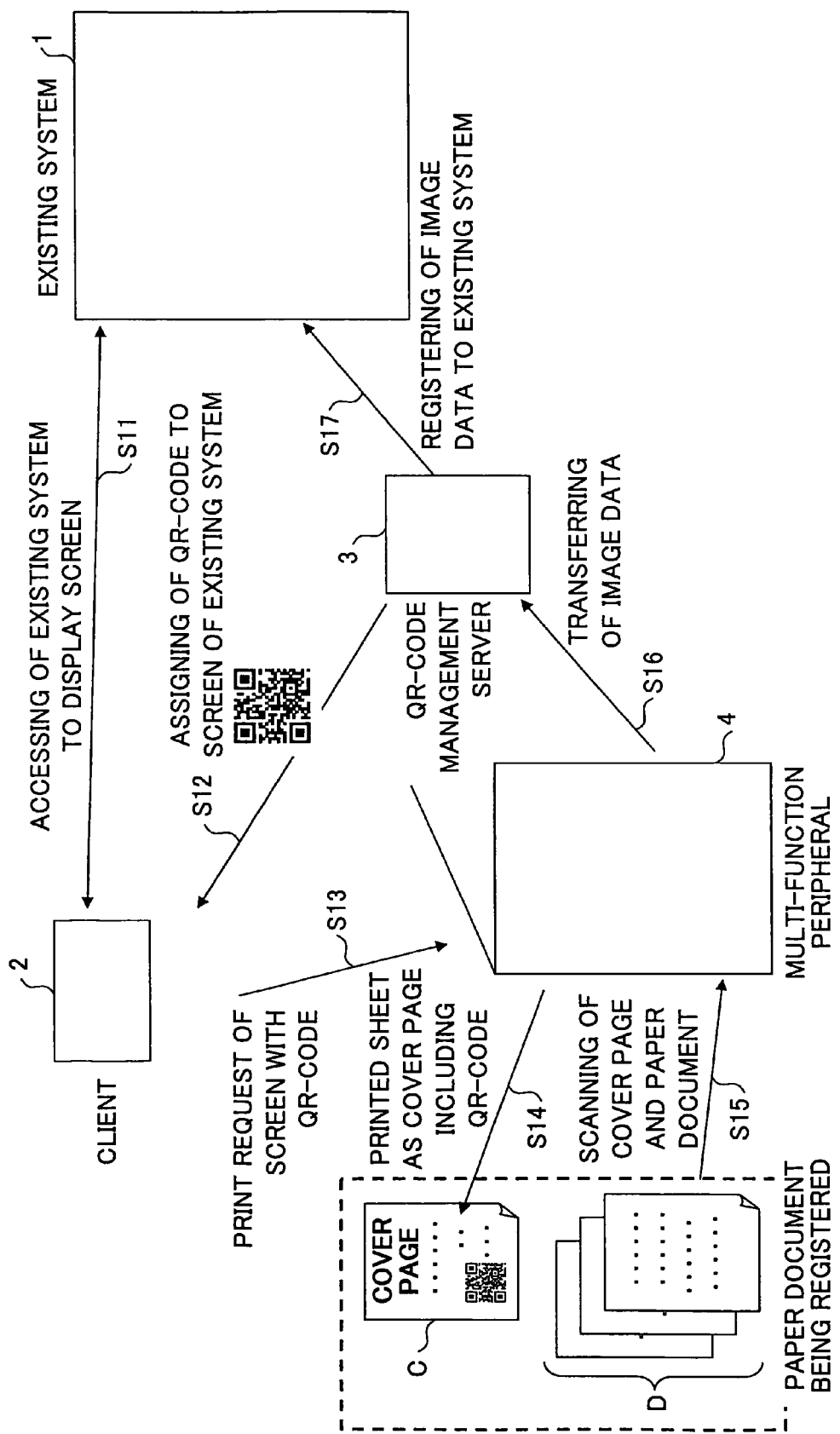
FIG. 5 is a diagram showing the procedure of electronization and registration of paper documents to the existing system in one embodiment of the invention.

FIG. 5 shows the procedure of electronization and registration to the existing system of paper documents in one embodiment of the invention.

As shown in FIG. 5, the user who wishes to register paper documents D to the existing system 1, such as a conference management system, accesses the existing system 1 from the client 2, such as a personal computer which is operated by the user, and displays the screen of a corresponding registration site of the existing system on the client 2 (step S11).

Subsequently, the user sends a code assignment request from the client 2 to a QR-code management server 3 so that the QR-code management server 3 assigns a QR code that identifies the registration site of the existing system 1, to the screen of the existing system 1 being displayed on the client 1 (step S12). The user transmits a print request for printing the displayed screen of the existing system 1 including the assigned QR code, from the client 2 to a multi-function peripheral 4 having the functions of a scanner and a printer (step S13). The printed sheet is outputted as a cover page C including the QR-code image by the multi-function peripheral 4 (step S14). This cover page C is provided for the user as an automatic-registration request page when registering the electronic data of the paper documents D to the existing system 1.

And the user bundles the paper documents D with the cover page C being placed on the top of the paper documents D, and performs scanning of the cover page C and the paper documents D collectively by using the multi-function peripheral 4 (step S15).

The read image data are transferred from the multi-function peripheral 4 to the QR-code management server 3 (step S16). The QR-code management server 3 judges the registration site from the code assigned to the cover page C, and registers the image data from which the cover page C is removed, to the existing system 1 (step S17).

What is needed for the user to register the paper documents D to the existing system 1 is to request the assignment of the QR in the state where the screen of the existing system 1 as the registration site is displayed on the client 2, and scan the paper documents D and the printed sheet of the cover page C in which the QR-code is included. Therefore, the handling can be simplified remarkably.

<System Composition>

Figure 6:
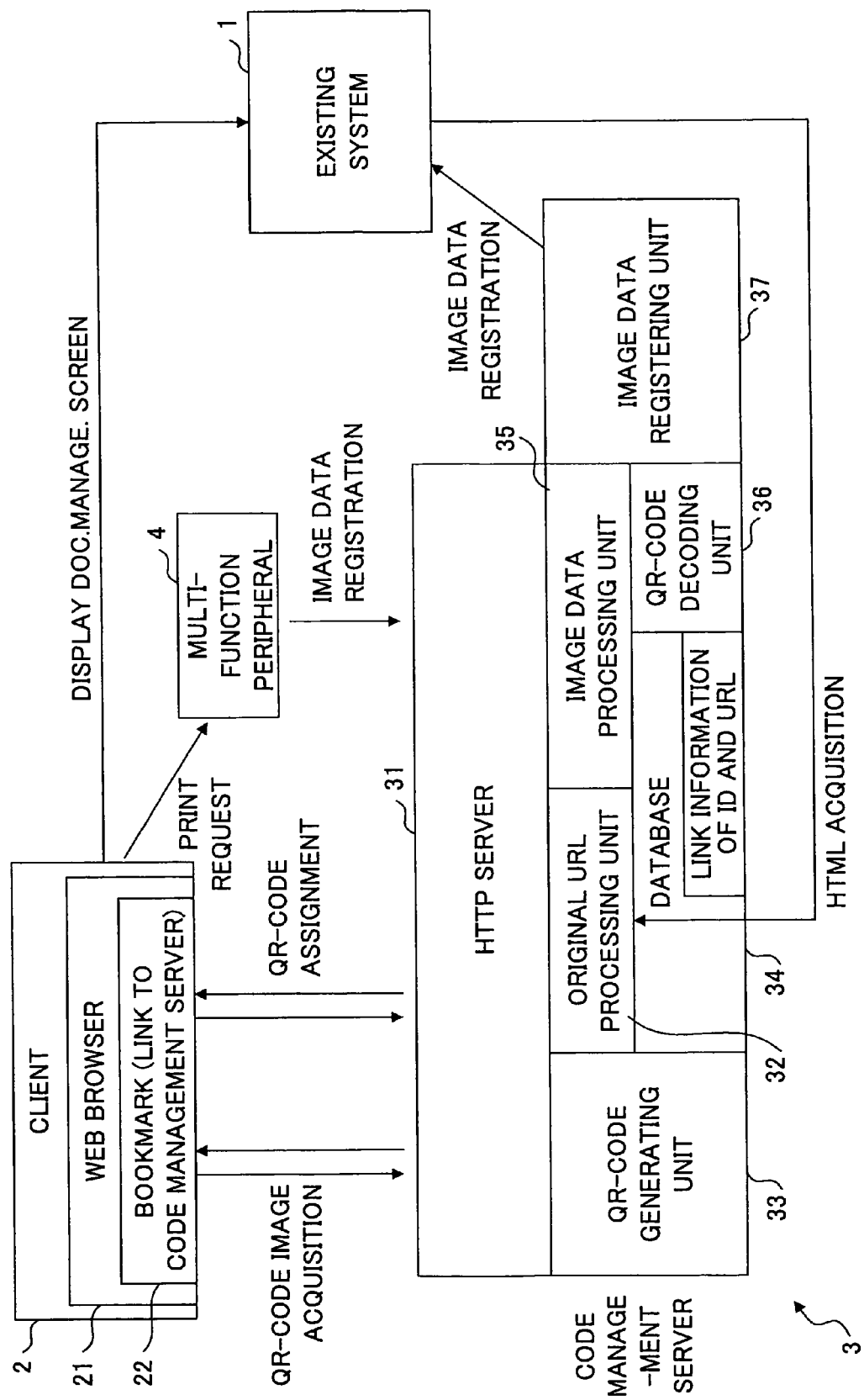
FIG. 6 is a diagram showing an example of a system composition of the document-management device in one embodiment of the invention.

FIG. 6 shows an example of a system composition of the document-management device in one embodiment of the invention. This system is constituted as a Web system, and the case in which the QR code is used as a code identifying the registration site will be explained.

However, the site identifying code according to the invention is not limited to QR code. The site identifying code may be a one-dimensional bar code or a character string which are readable by a scanner or the like.

In the example of FIG. 6, the client 2 includes a Web browser 21 for accessing the existing system 1 and the QR-code management server 3, and this Web browser 21 includes a bookmark 22 which is used to transmit a QR code assignment request to the QR-code management server 3.

The QR-code management server 3 includes a HTTP server 31, an original URL (Uniform Resource Locator) processing unit 32, a QR-code generating unit 33, a database 34, an image data processing unit 35, a QR-code decoding unit 36, and an image data registering unit 37.

The HTTP server 31 performs the I/O processing between the client 2 and the existing system 1 based on the HTTP (Hyper Text Transfer Protocol). The original URL processing unit 32 transmits to the client 2 a HTML (Hyper Text Markup Language) of the screen including a link to the QR code image, in response to the code assignment request received from the client 2. The QR code generating unit 33 generates a QR code image in response to a QR-code image acquisition request received from the client 2. The database 34 is provided to associate the ID of the QR code and the URL (original URL) of the screen. The image data processing unit 35 separates the image data of the cover page C from the scanned image data received from the multi-function peripheral 4. The QR code decoding unit 36 decodes the QR code from the image data of the cover page C. The image data registering unit 37 registers the image data of the paper documents to the existing system 1 according to the contents of the QR code.

In the example of FIG. 6, the functions of the HTTP server 31, the original URL processing unit 32, the QR code generating unit 33, the database 34, the image data processing unit 35, the QR code decoding unit 36, and the image data registering unit 37 are incorporated in the QR-code management server 3 which is independently provided.

There are merits that the document-management device can be realized with the introduction of a single server and the existing multi-function peripheral 4 can be utilized. However, there are also demerits that an additional server must be introduced and the load of the server becomes high.

FIGS. 7-11 show other examples of the system composition of the document-management device in embodiments of the invention.

Figure 7:
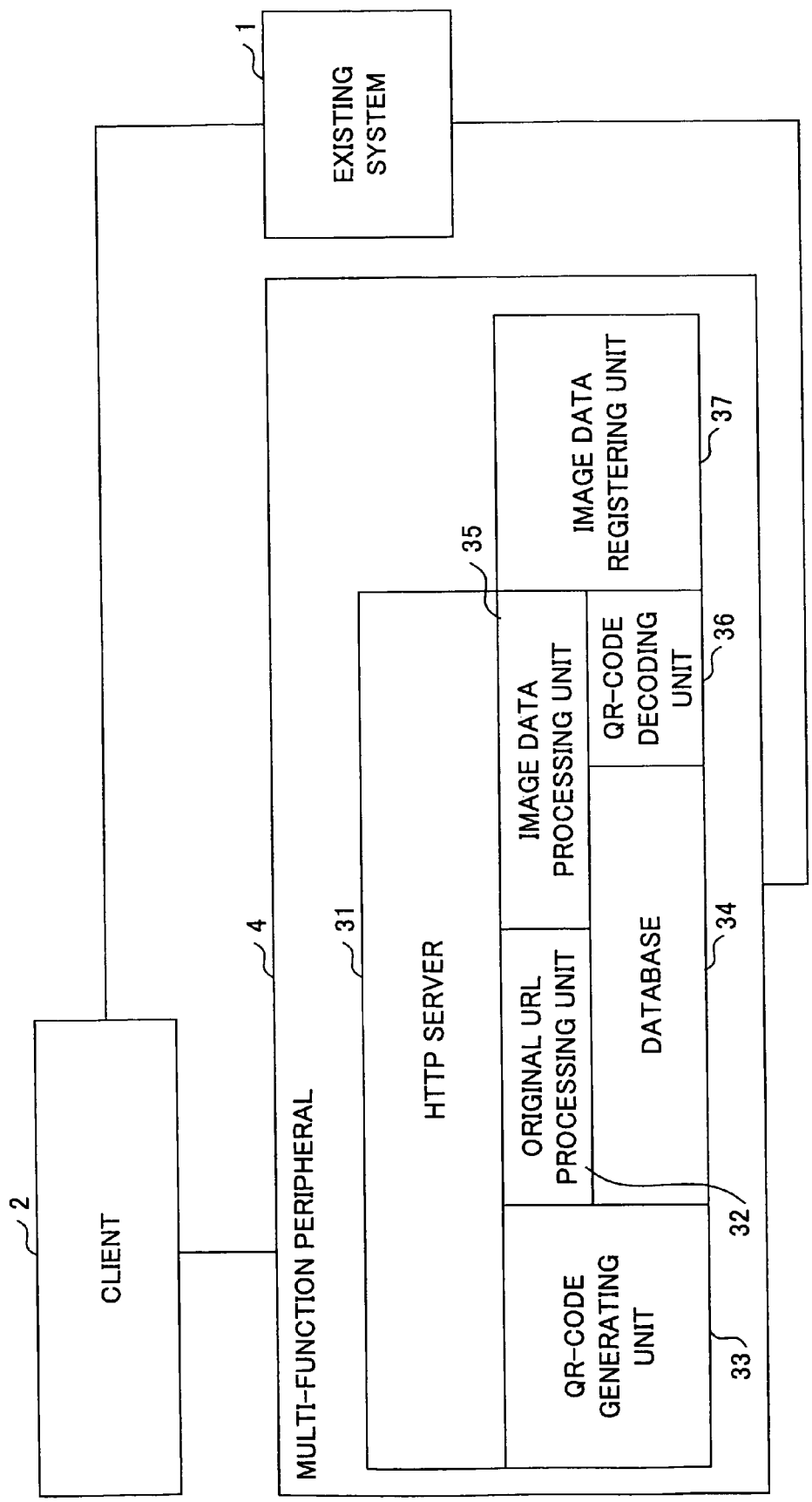
FIG. 7 is a diagram showing an example of the system composition of the document-management device in one embodiment of the invention.

In the example of FIG. 7, the functions of the HTTP server 31, the original URL processing unit 32, the QR code generating unit 33, the database 34, the image data processing unit 35, the QR code decoding unit 36, and the image data registering unit 37 are incorporated in the multi-function peripheral 4. In this case, while there is a merit that the document-management device can be realized with the introduction of a single multi-function peripheral 4 having the functions concerned, there is a demerit that the load of the multi-function peripheral 4 becomes high.

Figure 8:
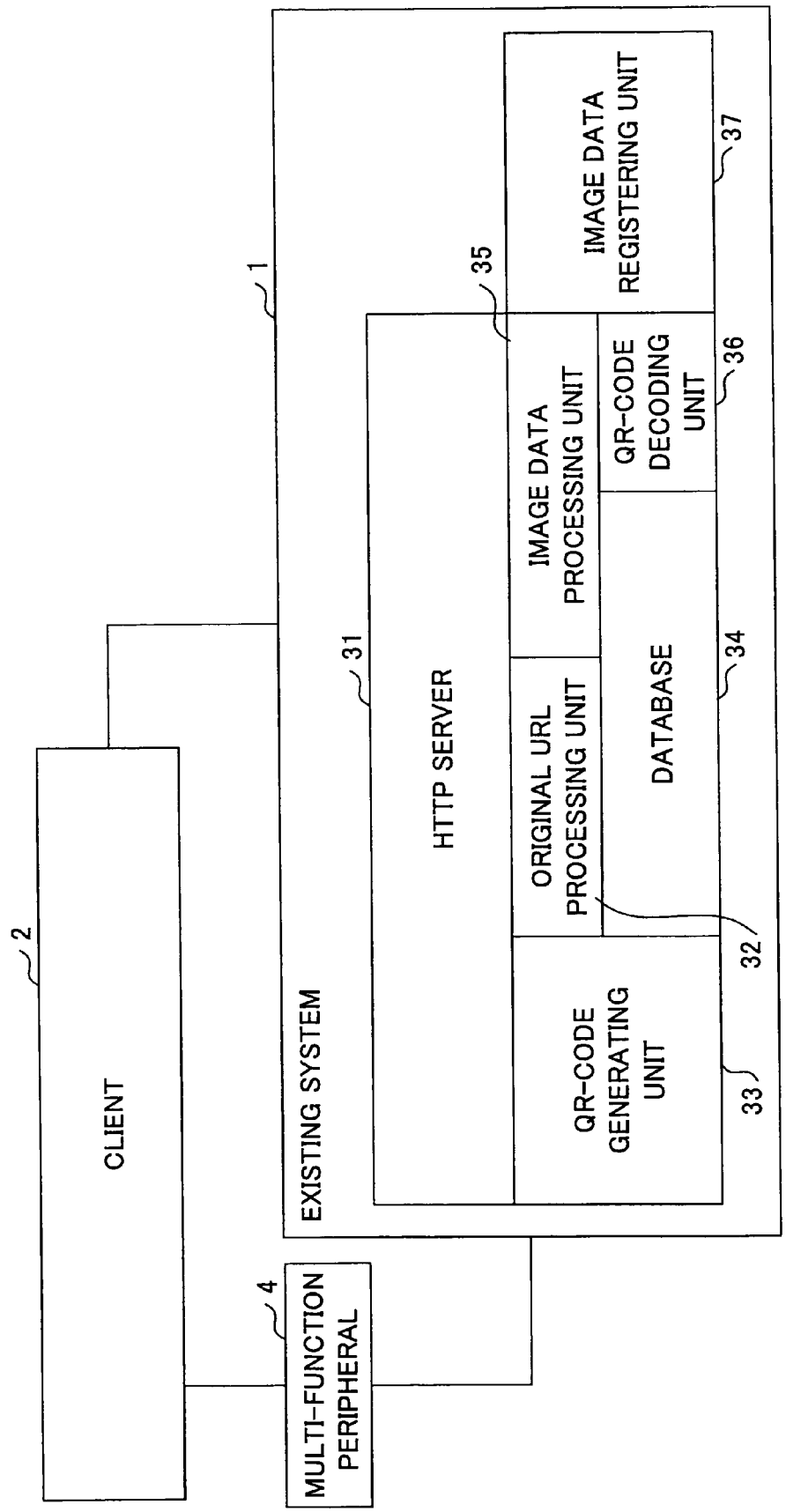
FIG. 8 is a diagram showing an example of the system composition of the document-management device in one embodiment of the invention.

In the example of FIG. 8, the functions of the HTTP server 31, the original URL processing unit 32, the QR code generating unit 33, the database 34, the image data processing unit 35, the QR code decoding unit 36, and the image data registering unit 37 are incorporated in the existing system 1. In this case, while there are merits that an additional server is unnecessary and the existing multi-function peripheral 4 can be utilized, there are demerits that the existing system 1 must be changed and the load of the existing system 1 becomes high.

Figure 9:
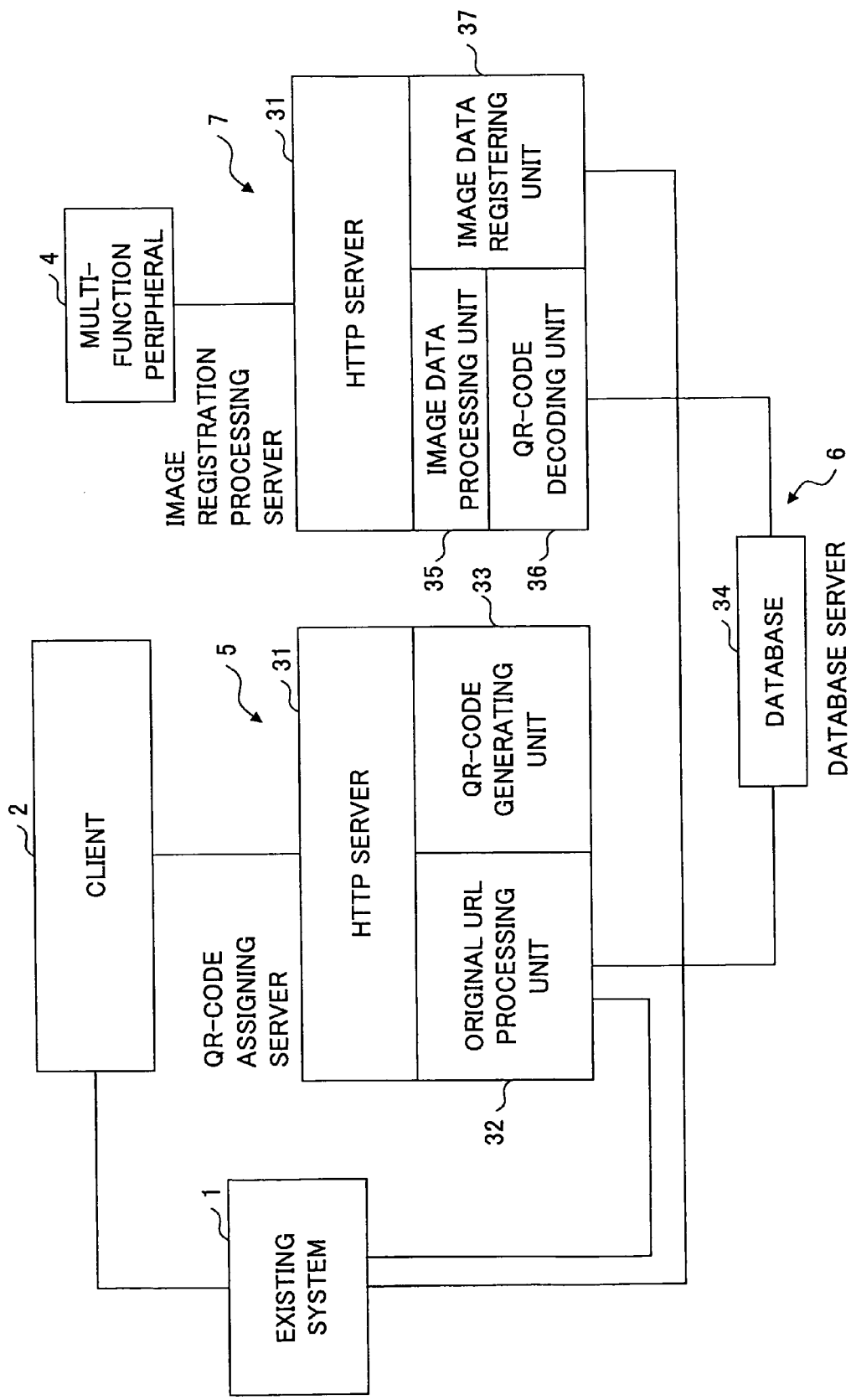
FIG. 9 is a diagram showing an example of the system composition of the document-management device in one embodiment of the invention.

In the example of FIG. 9, separate servers are used for the functions. The QR code assignment server 5 includes the HTTP server 31, the original URL processing unit 32, and the QR code generating unit 33. The database server 6 includes the database 34. The image registration server 7 includes the HTTP server 31, the image data processing unit 35, the QR code decoding unit 36, and the image-data registering unit 37. In this case, while there are merits that the load of the server can be distributed and the existing multi-function peripheral 4 can be utilized, there is a demerit that a plurality of servers are required.

Figure 10:
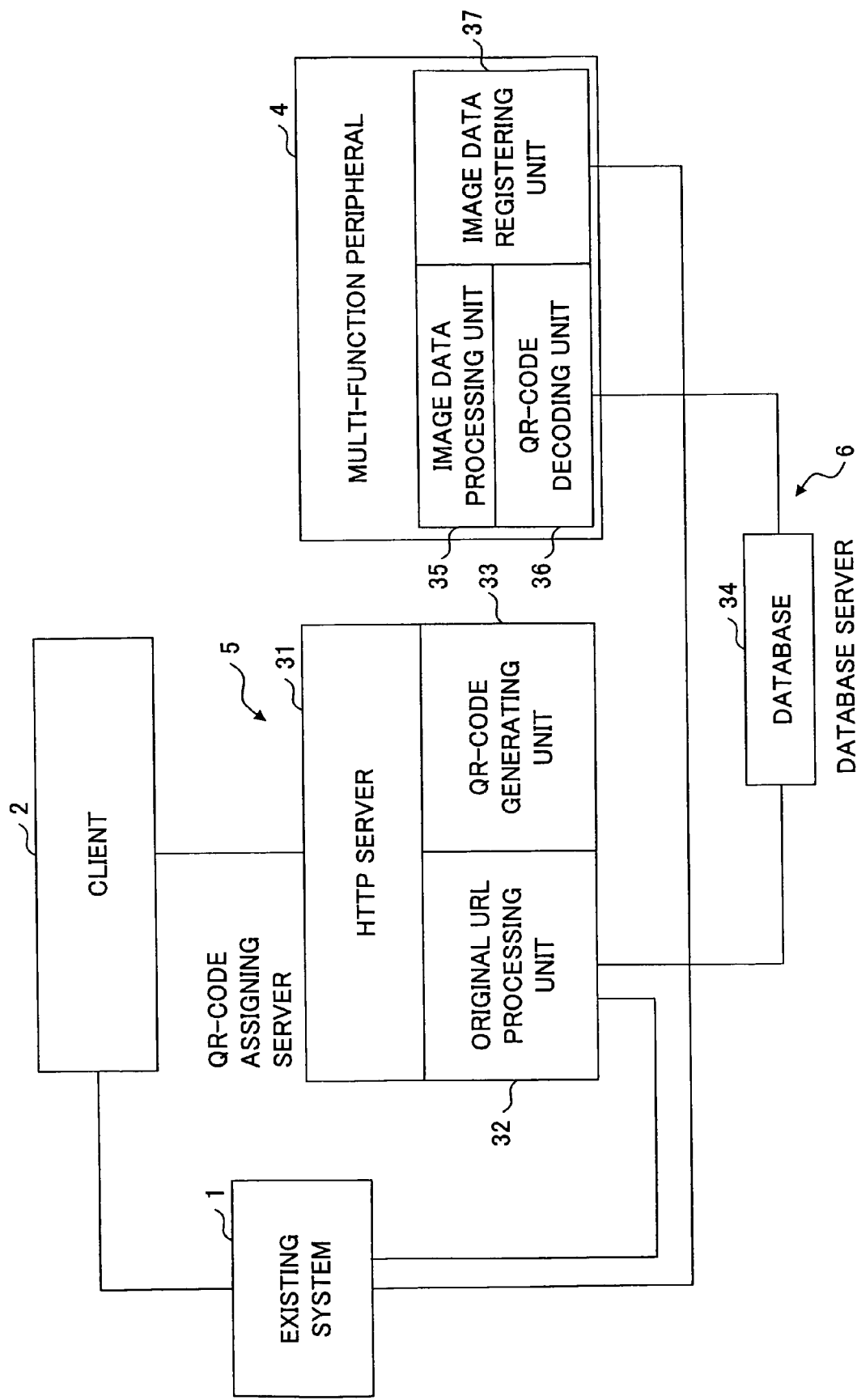
FIG. 10 is a diagram showing an example of the system composition of the document-management device in one embodiment of the invention.

In the example of FIG. 10, the composition of FIG. 9 is modified so that the functions of the image registration server 7 are incorporated in the multi-function peripheral 4, and the HTTP server 31 can be omitted by the use of the corresponding function of the multi-function peripheral 4. In this case, while there is a merit that the image processing can be performed by the multi-function peripheral 4 and the load of the server can be distributed, there is a demerit that the existing multi-function peripheral 4 cannot be utilized and a plurality of servers are required.

Figure 11:
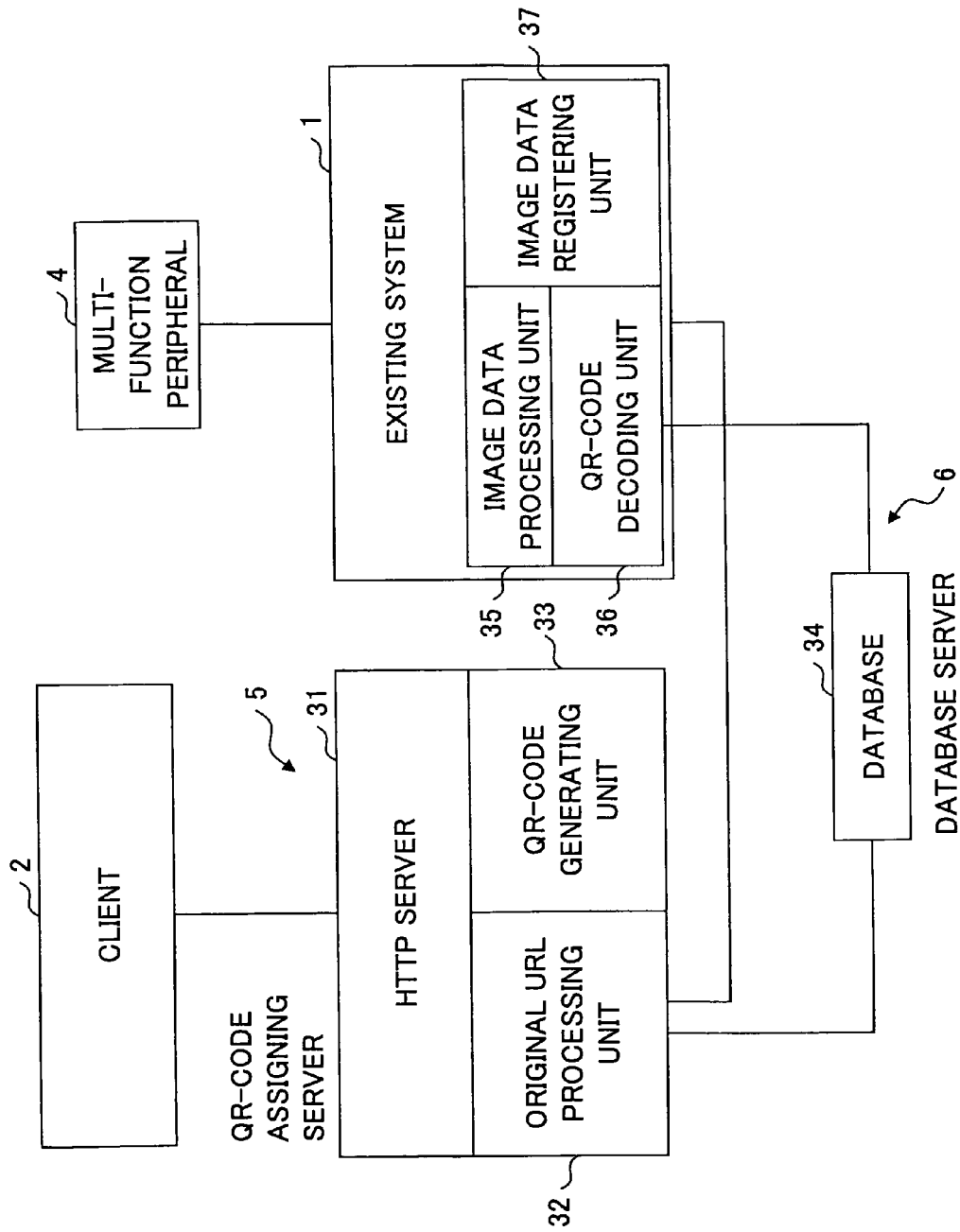
FIG. 11 is a diagram showing an example of the system composition of the document-management device in one embodiment of the invention.

In the example of FIG. 11, the composition of FIG. 9 is modified so that the functions of the image registration server 7 are incorporated in the existing system 1, and the HTTP server 31 can be omitted by the use of the corresponding function of the existing system 1. In this case, while there are merits that the image processing can be performed by the existing system 1, the load of the server can be distributed and the existing multi-function peripheral 4 can be utilized, there is a demerit that the existing system 1 must be changed.

<Details of Processing>

Next, the details of the processing of each of the respective units of the document-management device will be explained. The following description of the processing is mainly based on the composition shown in FIG. 6. However, even in the cases of the compositions shown in FIGS. 7 to 11, the description of the processing is essentially the same as in the following.

Figure 12:
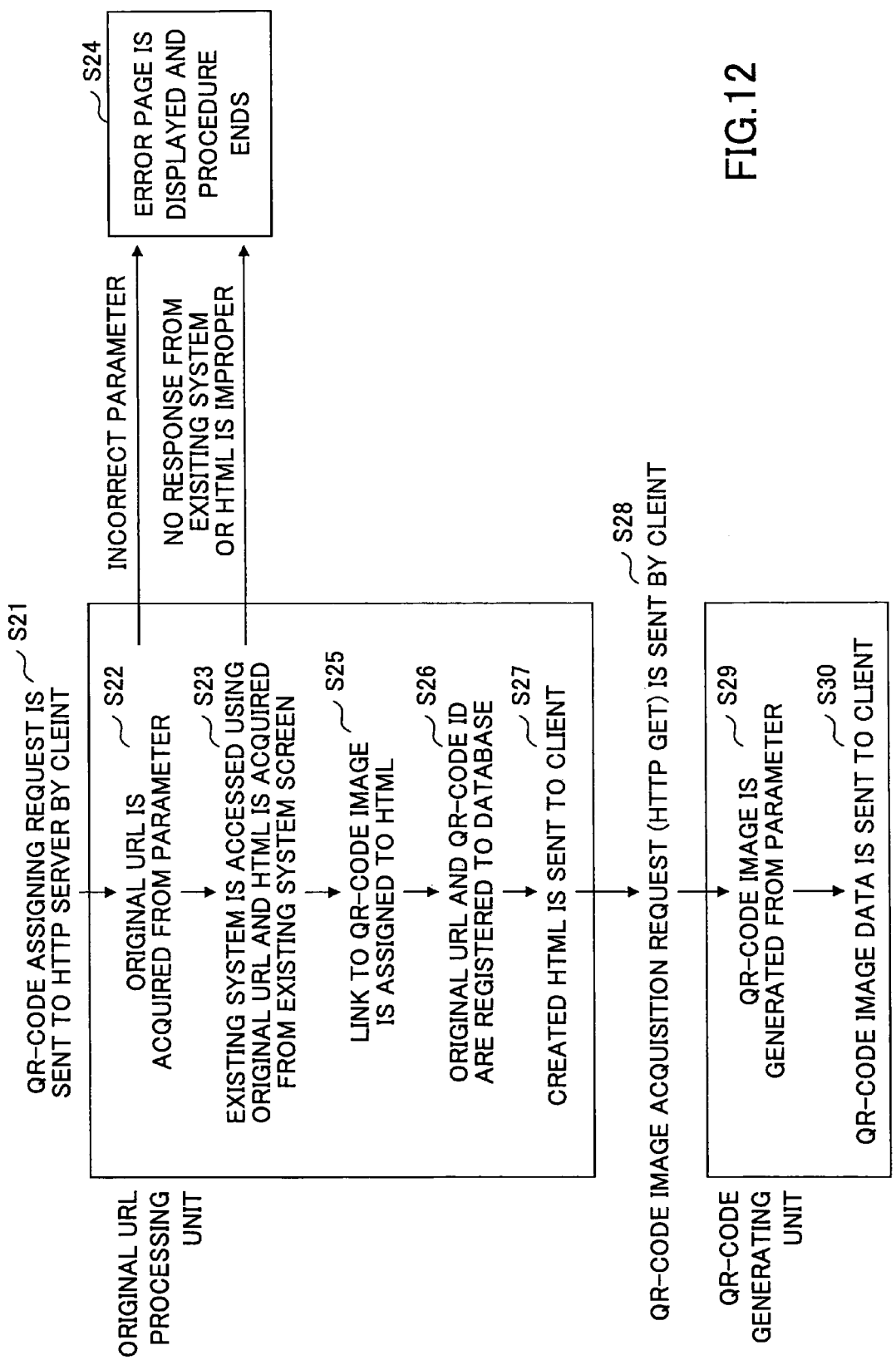
FIG. 12 is a diagram showing the processing of the QR code assignment.

FIG. 12 is a diagram for explaining the processing of the QR code assignment. As shown in FIG. 12, a QR code assignment request is sent to the HTTP server 31 of the QR-code management server 3 by the client 2 in the state where the screen of the registration site of the existing system 1 is displayed (step S21).

FIG. 13 shows an example of the user interface which transmits the QR code assignment request by the Web browser 21 of the client 2. As shown, the QR code assignment request can be transmitted by clicking the "adding QR code" button 23 of the display screen with the mouse.

FIG. 14A and FIG. 14B show an example of the bookmarklet for transmitting the QR code assignment request, and an example of the HTTP request generated. As shown in FIG. 14A, it is supposed that a short description of JavaScript (which will be called bookmarklet) is registered to the Web browser 21 of the client 2 as the bookmark 22, and it is associated with the button 21 so that transmission of the QR code assignment request may be initiated by clicking the button 23.

In this example, the designation of the URL and the parameter of the connection destination "javascript:location.href=" is performed by execution of the JavaScript description. As the URL and the parameter of the connection destination, the URL of the HTTP server 31 of the QR-code management server 3 "http://server/", the parameter "code?url=", and the character string "encodeURIComponent (location.href)", which is created by decoding the URL of the current display image of the Web browser 21 into the URI (Uniform Resource Identifier), are connected together.

The HTTP request, as shown in FIG. 14B, is transmitted to the HTTP server 31 by the execution of the above-mentioned bookmarklet. In the example of FIG. 14B, "http://originalserver/content.html" indicates the original URL of the screen of the existing system 1 of the registration site currently displayed on the client 2.

Referring back to FIG. 12, the original URL processing unit 32 acquires from the parameter of the received QR code assignment request the original URL which indicates the screen of the existing system 1 currently displayed on the client 2 (step S22). The existing system 1 is accessed based on this original URL, and the original HTML of the screen is acquired (step S23).

When the parameter of the received QR code assignment request is not correct, or when the existing system 1 does not answer, or when the acquired HTML is improper, an error page is displayed and the procedure is ended (step S24).

On the other hand, when the acquisition of the original URL and acquisition of the original HTML are carried out normally, the original URL processing unit 32 issues an ID of the QR code and assigns a link to the QR code image to the original HTML (step S25). The original URL processing unit 32 registers the original URL and the QR code ID to the database 34 (step S26), and transmits the created HTML after processing to the client 2 (step S27).

FIG. 15A, FIG. 15B and FIG. 15C show an example of the acquisition of the original HTML, and the assignment of the link to the QR code image. FIG. 15A shows the original HTML acquisition HTTP request (GET) being sent to the existing system 1. FIG. 15B shows the HTTP response containing the original HTML sent from the existing system 1, and FIG. 15C shows the HTML to which the link to the QR code image (the portion enclosed in the small rectangle) is assigned. In the example, "qrcode?v=123456" is the parameter which indicates the QR code ID.

Figures 16, 17A, 17B:
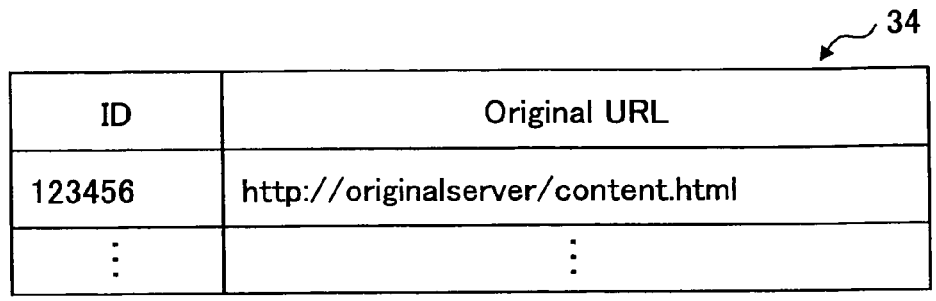
FIG. 16 is a diagram showing an example of a database.
FIG. 17A and FIG. 17B are diagrams showing an example of the acquisition of the QR code image.

FIG. 16 shows an example of the database 34. As shown in FIG. 16, the original URL and the QR code ID are associated and registered to the database 34.

Referring back to FIG. 12, the display of the received HTML is started at the client 2, and a QR code image acquisition request is sent to the HTTP server 31 by the client 2 in the process in which the link to the QR code image contained in the HTML is processed (step S28).

In the meantime, the QR code generating unit 33 takes out the QR code ID from the parameter of the received request, and generates a QR code image by encoding of the QR code ID (step S29). The encoding algorithm in this case is in conformity with the JISX0510 standard. And the QR code generating unit 33 transmits the QR code image data to the client 2 (step S30). In the client 2 which receives the QR code image, the screen of the existing system 1 previously displayed is changed to the display screen in which the received QR code image is superimposed.

FIG. 17A and FIG. 17B show an example of the acquisition of the QR code image. FIG. 17A shows the QR code image acquisition HTTP request (GET) being sent to the HTTP server 31, and FIG. 17B shows the HTTP response sent from the HTTP server 31. FIG. 18 shows an example of the display screen with the QR code image being superimposed, which is displayed on the client 2. In the example of FIG. 18, the state where the display screen of the existing system 1 in which the QR code image 24 and the note 25 are overlapped is illustrated.

FIG. 19 shows the other processing of the QR code assignment, which is adapted for processing the HTML data by execution of the bookmarklet on the side of the client 2. As shown in FIG. 19, the bookmark in which the bookmarklet is implemented (which is the same as the "adding QR code" button 23 shown in FIG. 13) is clicked and the execution of the bookmarklet is started at the client 2 in the state where the screen of the existing system 1 of the registration site is displayed (step S201).

FIG. 20A and FIG. 20B show an example of the bookmarklet. FIG. 20A shows the one-line version form of the bookmarklet implemented, and FIG. 20B shows the form of the bookmarklet which is processed to increase the readability.

Referring back to FIG. 19, the operation of the bookmarklet allows assignment of the link to the QR code image to the original page HTML (step S202).

Subsequently, the displaying of the HTML is started at the client 2, and a QR code image acquisition request is sent to the HTTP server 31 by the client 2 in the process in which the link to the QR code image contained in the HTML is processed (step S203). Thereby, the original URL processing unit 32 acquires the original URL and the QR code ID, and registers the original URL and the QR code ID to the database 34 (step S204).

The QR code generating unit 33 generates the QR code image by encoding of the QR code ID (step S205). The encoding algorithm in this case is in conformity with the JISX0510 standard. And the QR code generating unit 33 transmits the QR code image data to the client 2 (step S206). Thereby, the display screen of the existing system 1 previously displayed on the client 2 is changed to the state in which the QR code image is overlapped.

According to this example, the size of the bookmarklet executed by the client 2 becomes slightly large, but the load on the side of the QR-code management server 3 can be reduced.

Thus, the screen of the registration site displayed on the client 2 is printed by the multi-function peripheral 4 as the cover page C in accordance with the instructions of the user. And the user bundles the paper documents D with the cover page C being placed on the top of the paper documents D, and performs scanning of the cover page C and the paper documents D collectively by using the multi-function peripheral 4.

FIG. 21 shows an example of the authentication screen at the time of starting of operation of the multi-function peripheral 4. As shown, the use of the multi-function peripheral 4 is permitted by inputting the user's own PIN code to the PIN code input screen 41 for the purpose of security.

FIG. 22 shows an example of the user interface for starting a scan operation. In the example of FIG. 22, the optimized scan button 42 is specifically adapted in the user interface screen displayed on the client 2. When the button 42 is clicked by the user, the scanned image data is automatically transmitted to the image data processing unit 35 after the scanning of the paper documents C is completed. Namely, the registration of the image data of the paper documents C to the existing system 1 is automatically performed by using the QR code assigned to the cover page C.

Figure 23:
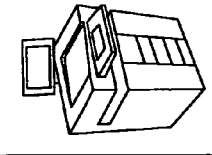
FIG. 23 is a diagram showing an example of the screen in which the scanning is in progress.
Figure 24:
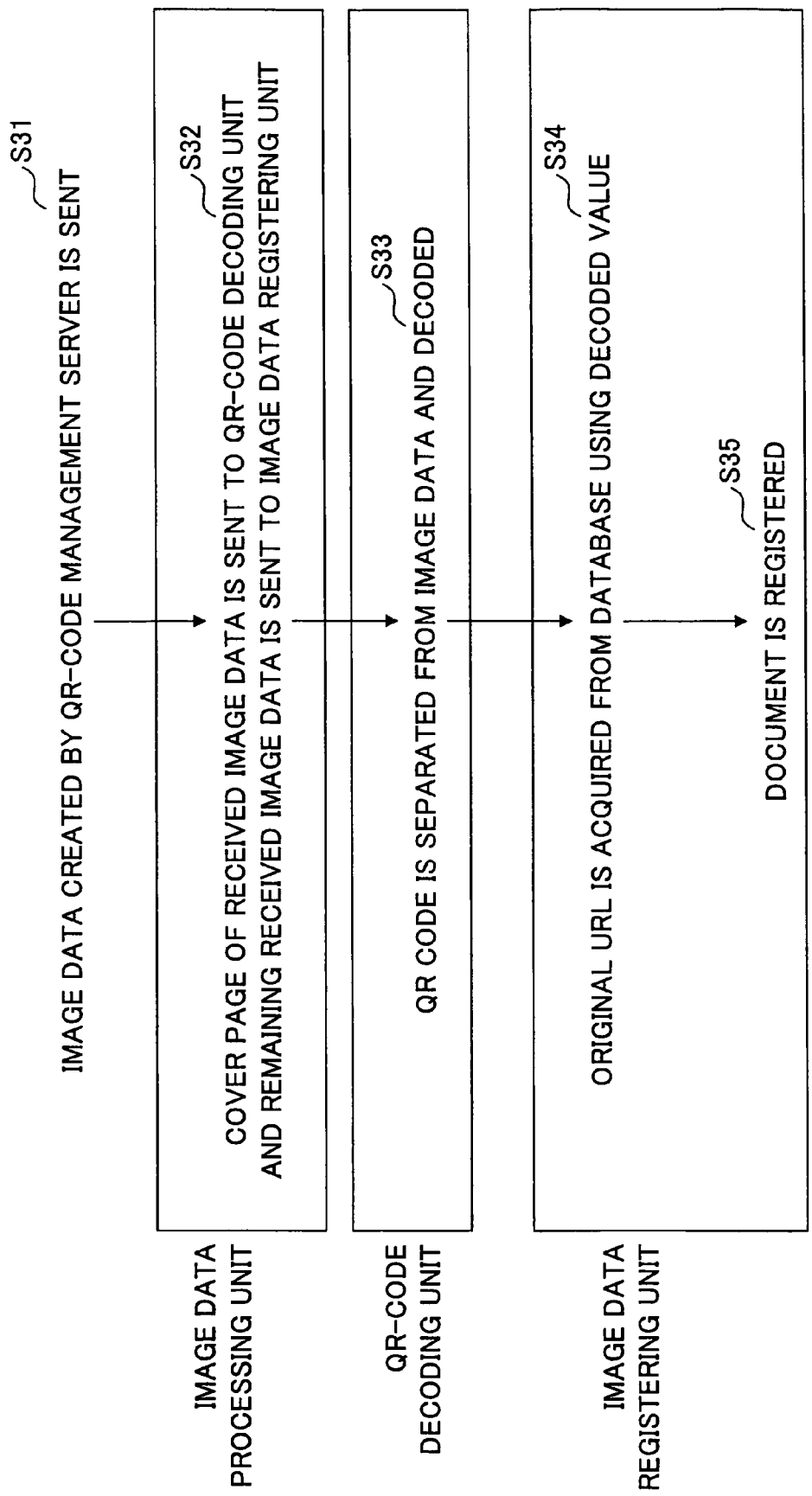
FIG. 24 is a diagram for explaining the processing from the scanning to the registration to the existing system.

FIG. 23 shows an example of the screen in which the scanning is in progress. FIG. 24 shows the processing from the scanning to the registration to the existing system 1.

As shown in FIG. 24, the multi-function peripheral 4 to which the scanning is instructed by the user, transmits the image data (file) created by the scanning, to the QR-code management server 3 (step S31).

When the image data is received at the QR-code management server 3, the image data processing unit 35 separates the received image data (file) into a cover page portion corresponding to the cover page C and a body portion corresponding to the paper documents D following the cover page C, transfers the cover page portion to the QR code decoding unit 36, and transfers the remaining body portion to the image-data registering unit 37 (step S32).

Figure 25:
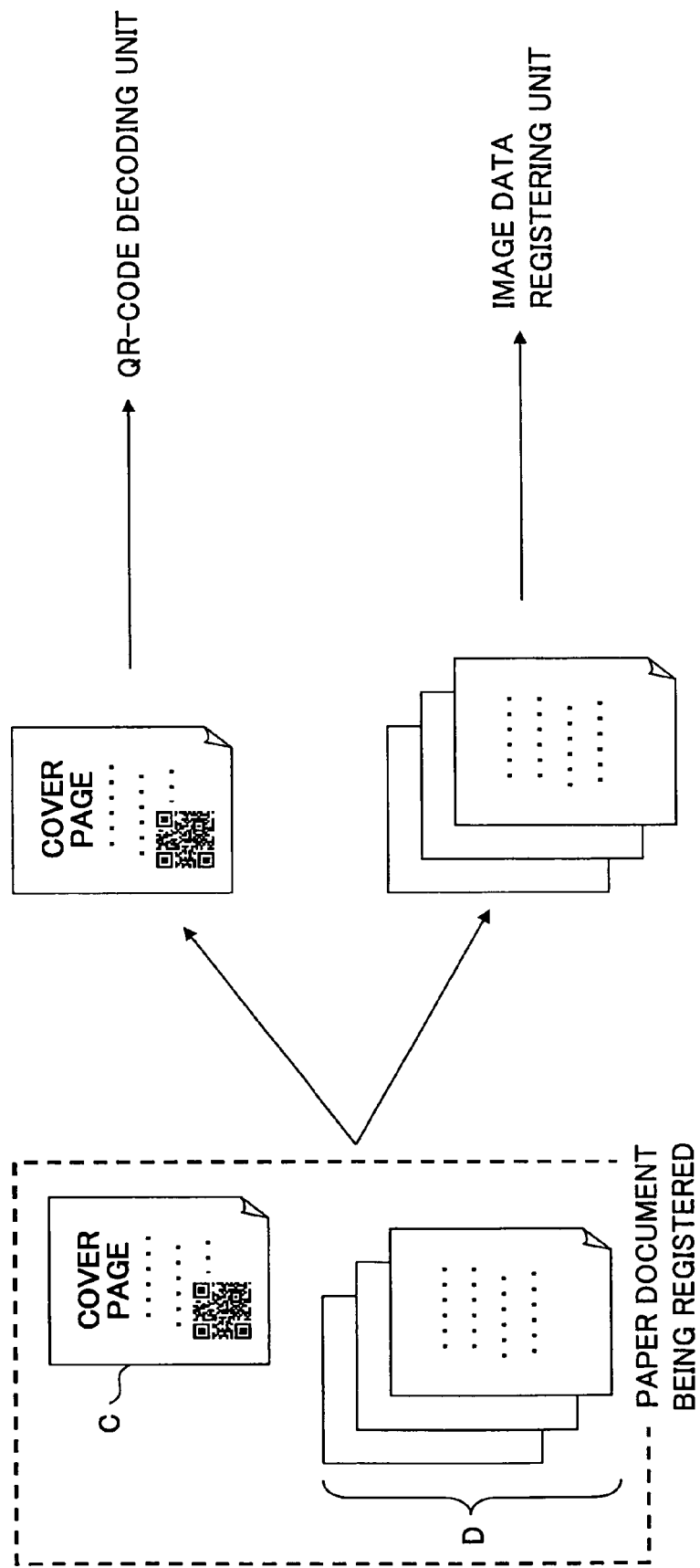
FIG. 25 is a diagram for explaining the processing performed by the image data processing unit.

FIG. 25 is a diagram for explaining the processing performed by the image data processing unit 35. As shown in FIG. 25, the image data processing unit 35 separates the image data of the scanned image data containing image data of the cover page C and image data of the paper documents D, into the cover page portion corresponding to the cover page C and the remaining body portion corresponding to the paper documents D. The cover page portion corresponding to the cover page C is transferred to the QR code decoding unit 36, and the body portion corresponding to the paper documents D is transferred to the image-data registering unit 37.

Figure 26:
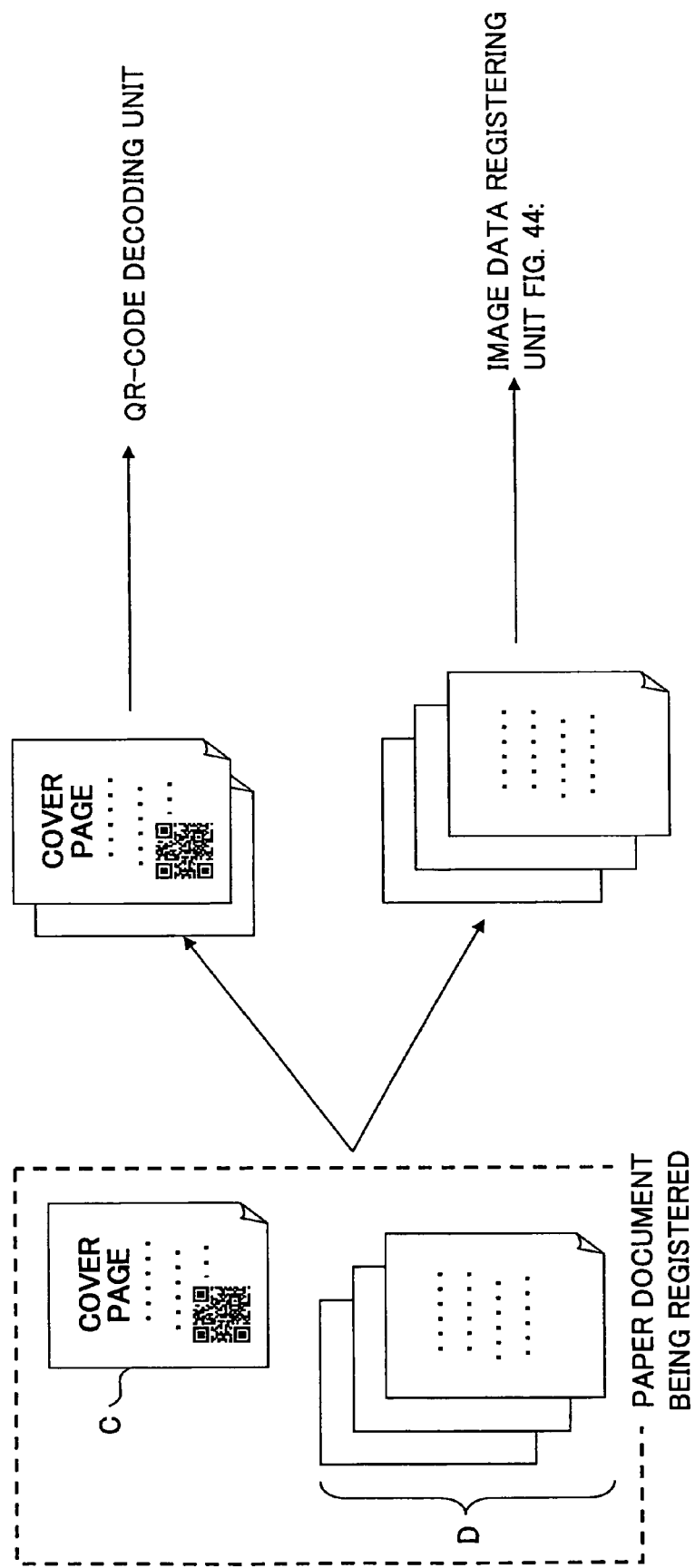
FIG. 26 is a diagram for explaining the processing performed by the image data processing unit.

FIG. 26 is a diagram for explaining the processing performed by the image data processing unit 35 when a double-sided scanning is performed. In the case of FIG. 26, the image data corresponding to the front of the cover page C and the back of the cover page C amount to 2 pages, and the cover page portion including the two-page image data is transferred to the QR code decoding unit 36, and the body portion corresponding to the remaining paper documents D is transferred to the image-data registering unit 37.

Returning to FIG. 24, the QR code decoding unit 36 receives the image data of the cover page portion corresponding to the cover page C, separates the QR code from the received image data, and performs the decoding of the QR code to obtain the QR-code ID (step S33).

Subsequently, the image-data registering unit 37 acquires the original URL by searching the database 34 with the key of the value (the QR-code ID) decoded by the QR code decoding unit 36 (step S34). And the image-data registering unit 37 accesses the existing system 1 by using the original URL, and registers the image data corresponding to the paper documents D to the existing system 1 (step S35).

FIG. 27 shows an example of the registration of the image data to the existing system 1. In the example of FIG. 27, the image data is registered by using the POST of the HTTP request.

<Measures for the Case where Authentication is Required>

FIG. 28 is a diagram for explaining the procedure of the electronization of paper documents and the registration to the existing system when authentication is required to use the existing system. The procedure of FIG. 28 is essentially the same as the procedure of FIG. 5 except the following matter.

Apart from the procedure of FIG. 5, in the procedure of FIG. 28, when assigning the QR code to the screen of the existing system 1 displayed on the client 2 (step S42), the cookie which is used for the authentication in accessing the existing system 1 to display the screen, is registered to the database 34. The cookie registered to the database 34 is used as the authentication information when the image data of the paper documents is registered to the existing system 1 (step S47).

FIG. 29A and FIG. 29B show an example of the bookmarklet for acquiring the authentication information by the cookie, and an example of the database 34. In the example of FIG. 29A, the bookmarklet is associated with the "adding QR code" button 23 (FIG. 13) which transmits the QR code assignment request, and "encodeURIComponent (document.cookie)" is created by decoding the cookie information of the display screen into the URI, and added to the parameter.

In the example of FIG. 29B, the database 34 is provided so that the QR code ID, the cookie value (cookie) and the original URL are associated and registered.

Figure 30:
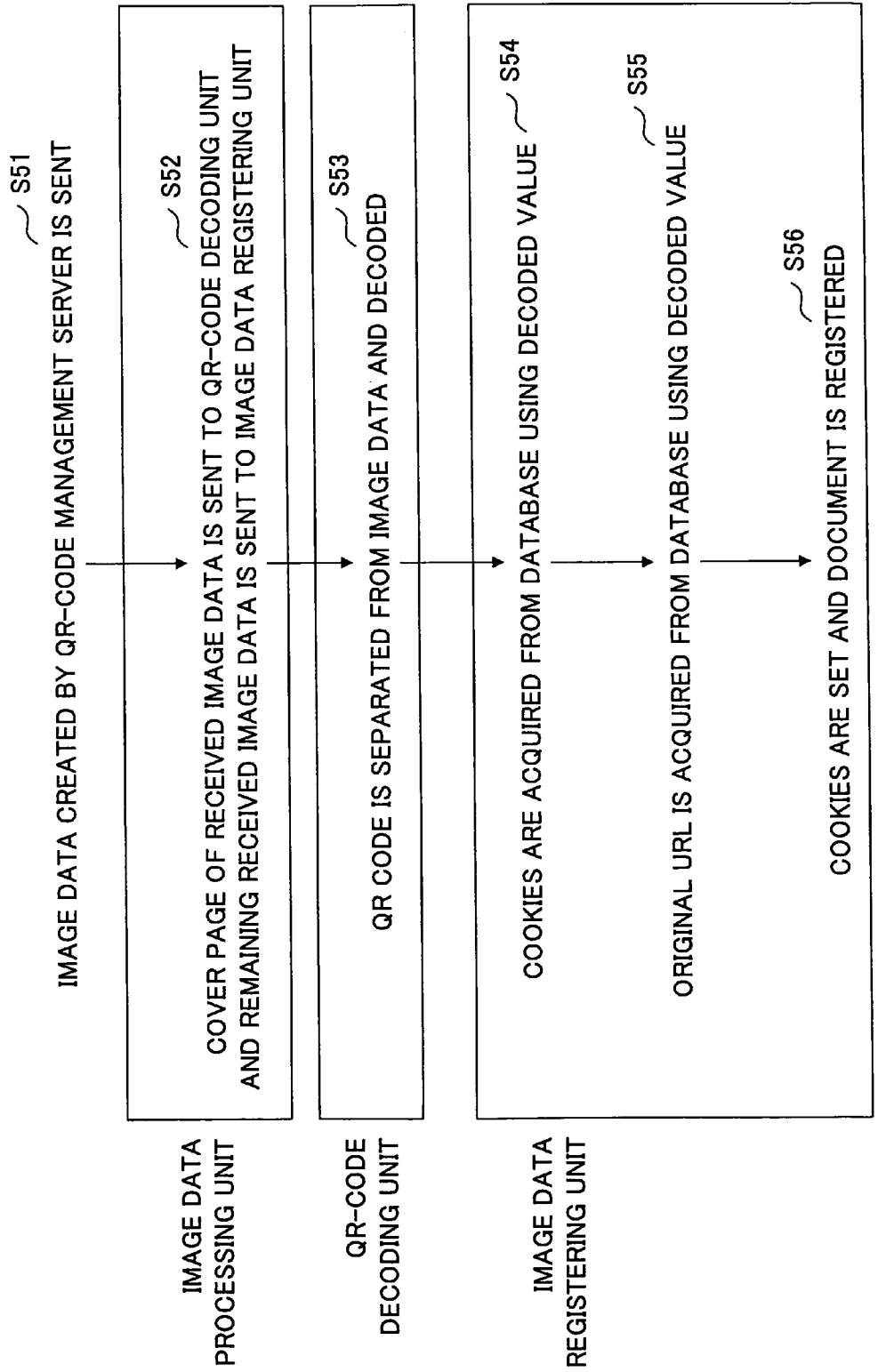
FIG. 30 is a diagram for explaining the processing from the scanning to the registration to the existing system.

FIG. 30 is a diagram for explaining the processing from the scanning to the registration to the existing system 1 in the case of using the cookie as the authentication information. The processing of FIG. 30 is essentially the same as the processing of FIG. 24 except the following matter. The processing (step S54) which acquires the cookie from the database 34 by using the key of the decoded value (the QR code ID) is added as the processing performed by the image-data registering unit 37. When the image data is registered to the existing system 1 (step S56), the setting of the cookie is performed.

FIG. 31 shows an example of the registration of the image data to the existing system 1. In the example of FIG. 31, the image data is registered by using the POST of the HTTP request.

<Setting of Term of Validity>

FIG. 32A, FIG. 32B and FIG. 32C show an example of the screen in the case of setting up the term of validity of the cover page C to which the QR code image is assigned, an example of the HTML, and an example of the database 34.

As shown in FIG. 32A, the button for choosing the desired term of validity among the set of options is displayed when the QR code image is assigned to the screen of the client 2. The user is requested to choose the desired term of validity on the display screen, so that the selected term of validity of the cover page C is set up. An example of the HTML of the screen in this case is shown in FIG. 32B. The HTML includes the tags for displaying the option buttons "1 hour", "1 day", and "1 week", and the JavaScript function which transmits the expiration date information as the parameter according to the selected option button.

An example of the database 34 in this case is shown in FIG. 32C. In the example of FIG. 32C, the QR code ID, the expiration date information (expireDate), and the original URL are associated and registered.

FIG. 33A, FIG. 33B and FIG. 33C are diagrams for explaining the processing of setting up of the term of validity, the HTTP request, and the database updating. As shown in FIG. 33A, the HTTP request is sent from the client 2 and the URL of the registration site indicated by "location.href" is acquired (step S61). The item "id" of the database 34 is updated using the parameter "min" which indicates the selected term of validity (step S62). The resulting HTML is displayed (step S63). In this manner, the setting up of the term of validity is performed.

FIG. 33B shows an example of the HTTP request generated on the side of the client 2, and FIG. 33C shows an example of the SQL sentence for updating the database 34 in the QR-code management server 3.

Figures 34A, 34B, 34C:
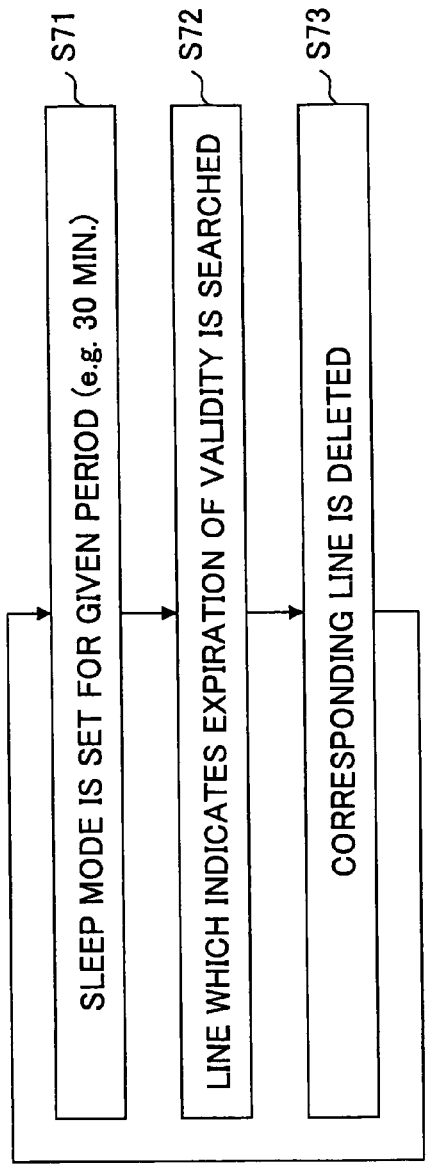
FIG. 34A, FIG. 34B and FIG. 34C are diagrams for explaining the processing of determination as to the term of validity performed by a daemon program.

FIG. 34A, FIG. 34B and FIG. 34C show an example of the processing of determination as to the term of validity which is set up by the processing of FIG. 33A, which is performed by the daemon program. As shown in FIG. 34A, the sleep mode is set for a given time (for example, 30 min.)(step S71). The line which indicates expiration of validity with respect to the set-up term of validity is searched from among the lines in the table of the database 34 (step S72). And the corresponding line is deleted from the table of the database 34 (step S73).

FIG. 34B shows an example of the SQL sentence which searches the ID of the line which indicates expiration of validity with respect to the set-up term of validity, and FIG. 34C shows an example of the SQL sentence which deletes the corresponding line from the table of the database 34.

FIG. 35 is a diagram for explaining the processing of determination of the term of validity at the time of image-data registration. As shown in FIG. 35, the scanned image data is inputted (step S81). The QR code ID is acquired by decoding of the QR code from the input image data (step S82). The expiration date information is acquired from the database 34 by using the QR-code ID as the key (step S83).

When the acquired expiration date is invalid with respect to the set-up term of validity, an error mail which notifies the user of the expiration of validity is transmitted (step S84). And the processing is ended (step S86).

When the acquired expiration date is valid with respect to the set-up term of validity, the scanned image data is registered to the existing system 1 (step S85). And the processing is ended (step S86).

In order to transmit the error mail to the user at step S84, it is assumed that an e-mail address of the user is registered before hand to the database 34 or the like.

<Setting of Use Count>

FIG. 36A, FIG. 36B and FIG. 36C show an example of the screen in the case of setting up the use count of the cover page C to which the QR code image is assigned, an example of the HTML, and an example of the database 34.

As shown in FIG. 36A, the button for choosing the desired use count among the set of options is displayed when the QR code image is assigned to the screen of the client 2. The user is requested to choose the desired use count on the display screen, so that the selected use count of the cover page C is set up. An example of the HTML of the screen in this case is shown in FIG. 36B. The HTML includes the tags for displaying the option buttons "1 time", "5 times", "10 times" and "no limit", and the JavaScript function which transmits the use count information as the parameter according to the selected option button.

An example of the database 34 in this case is shown in FIG. 36C. In the example of FIG. 36C, the QR code ID, the use count information (num), and the original URL are associated and registered.

FIG. 37A, FIG. 37B and FIG. 37C are diagrams for explaining the processing of setting up of the use count, an example of the HTTP request, and an example of the database updating. As shown in FIG. 37A, the HTTP request is sent from the client 2 and the URL of the registration site indicated by "location.href" is acquired (step S91). The item "id" of the database 34 is updated using the parameter "num" which indicates the selected use count (step S92). The resulting HTML is displayed (step S93). In this manner, the setup of the use count is performed.

FIG. 37B shows an example of the HTTP request generated on the side of the client 2, and FIG. 37C shows an example of the SQL sentence for updating the database 34 in the QR-code management server 3.

FIG. 38 is a diagram for explaining the processing of determination as to the use count. As shown in FIG. 38, the scanned image data is inputted (step S101). The QR-code ID is acquired by decoding of the QR code from the input image data (step S102). The use count information is acquired from the database 34 by using the QR-code ID as the key (step S103).

When the acquired use count is equal to zero, the processing is ended (step S107). When the acquired use count is above 2, the use count is decremented and the scanned image data is registered to the existing system 1 (step S104), and the processing is ended (step S107).

When the acquired use count is equal to 1, the corresponding line of the database 34 is deleted and the scanned image data is registered to the existing system 1 (step S105), and the processing is ended (step S107).

When the acquired use count is below zero (which indicate the "no limit" case), the scanned image data is registered to the existing system 1 (step S106), and the processing is ended (step S107).

<Display of Use Count>

FIG. 39A and FIG. 39B are diagrams for explaining the processing of acquisition and displaying of the use count. Since there is a case where the use count is uncertain to the user who views the cover page C, the displaying of the use count is necessary. As shown in FIG. 39A, the cover page C is scanned by using the multi-function peripheral 4 (step S111). The image data of the cover page C is transmitted to the QR-code management server 3 from the multi-function peripheral 4 (step S112). The use count is transmitted to the multi-function peripheral 4 from the QR-code management server 3 (step S113). In this manner, the use count can be displayed on the operation panel of the multi-function peripheral 4, and can be checked by the user.

FIG. 39B is a diagram for explaining the processing of acquisition and displaying of the use count. As shown in FIG. 39B, the user scans the cover page C by using the multi-function peripheral 4 (step S121). The multi-function peripheral 4 transmits the scanned image data of the cover page C to the QR-code management server 3 (step S122).

The QR code decoding unit 36 of the QR-code management server 3 decodes the QR code from the received image data (step S123). The QR code decoding unit 36 acquires the use count from the database 34 by using as the key the QR code ID which is the decoded QR code (step S124).

And the QR-code management server 3 transmits the use count back to the multi-function peripheral 4 as the response (step S125). The multi-function peripheral 4 displays the received use count on the operation panel (step S126). And the processing is ended (step S127).

FIG. 40 shows an example of the user interface in which the display of the use count in the multi-function peripheral 4 is requested by the user. In the example of FIG. 40, the "display use count of cover page" button 43 for acquiring and displaying the use count is provided.

Figure 42:
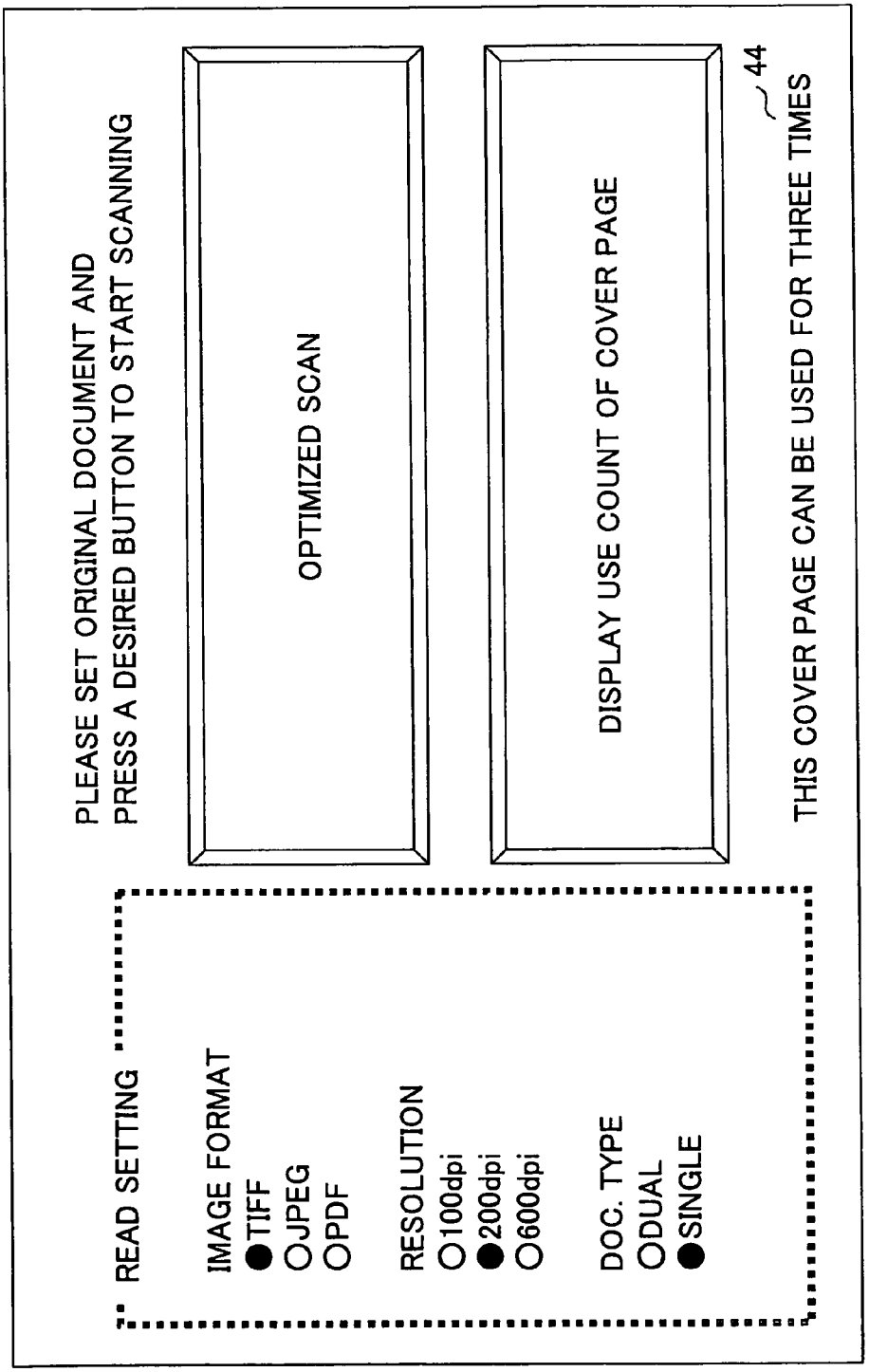
FIG. 42 is a diagram showing an example of the display of the use count.

FIG. 41A, FIG. 41B and FIG. 41C show an example of the HTTP request of acquisition of the use count. FIG. 41A shows an example of the HTTP request for sending the scanned image data of the cover page C from the multi-function peripheral 4 to the QR-code management server 3. FIG. 41B shows an example of the HTTP response, containing the use count, which is sent from the QR-code management server 3 to the multi-function peripheral 4. FIG. 41C shows an example of the SQL sentence which is provided for acquiring the use count from the database 34 in the QR-code management server 3 by using the QR-code ID as the key. FIG. 42 shows an example of the display of the use count. In the example of FIG. 42, the indication 44 "this cover page can be used for 3 times" is displayed.

Figure 43A:
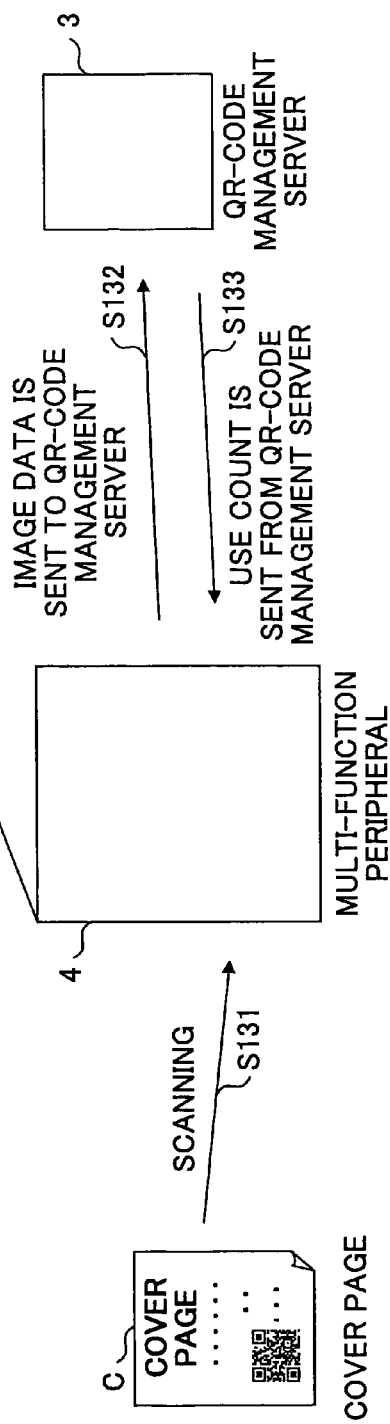
FIG. 43A and FIG. 43B are diagrams for explaining the processing of acquisition and displaying of the use count.
Figure 43B:
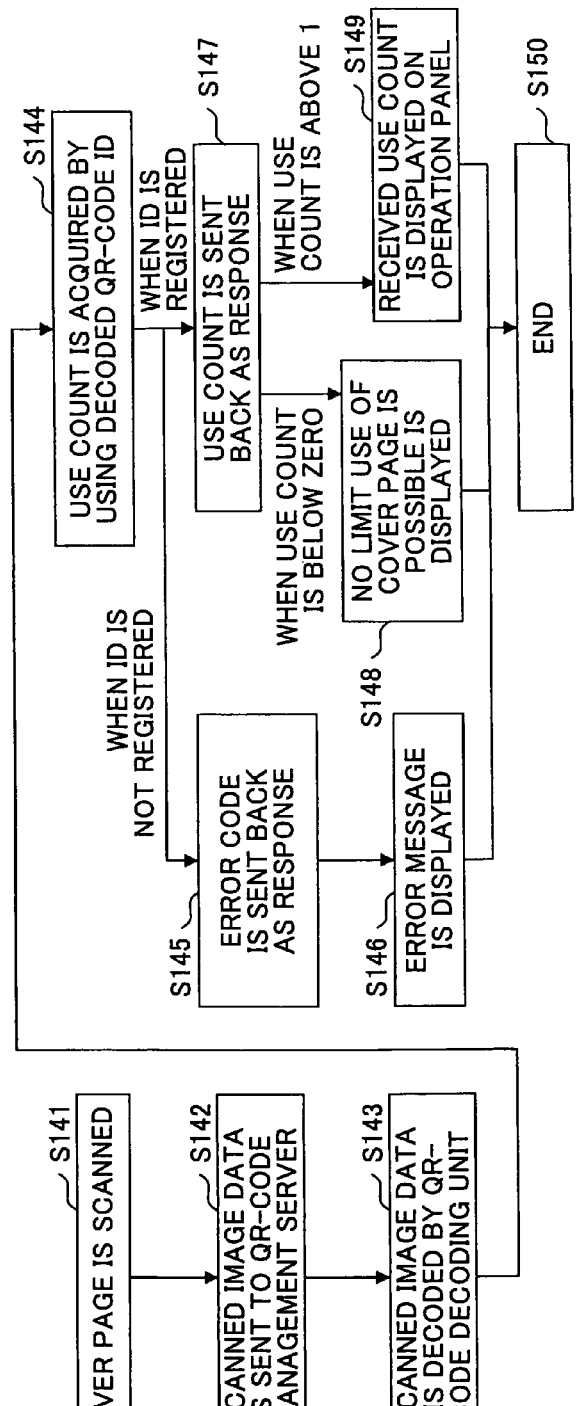

FIG. 43A and FIG. 43B are diagrams for explaining the processing of acquisition and displaying of the use count. In this example, not only the use count is acquired and displayed, but also the determination as to the use count and as to the registration of the QR-code ID is performed additionally.

As shown in FIG. 43A, the cover page C is scanned by using the multi-function peripheral 4 (step S131). The image data of the cover page C is transmitted to the QR-code management server 3 from the multi-function peripheral 4 (step S132). The use count is transmitted to the multi-function peripheral 4 from the QR-code management server 3 (step S133). The contents of the received use count are determined and displayed in the multi-function peripheral 4.

FIG. 43B is a diagram for explaining the processing of acquisition and displaying of the use count. The user scans the cover page C by using the multi-function peripheral 4 (step S141). The multi-function peripheral 4 transmits the image data of the scanned cover page C to the QR-code management server 3 (step S142).

The QR code decoding unit 36 of the QR-code management server 3 decodes the QR code from the received image data (step S143). The use count is acquired from the database 34 by using as the key the QR-code ID which is the decoded QR code (step S144).

When the QR-code ID is not registered, the response containing an error code indicating no registration of the QR-code ID is sent from the QR-code management server 3 to the multi-function peripheral 4 (step S145). And the multi-function peripheral 4 displays an error message indicating no registration of the QR-code ID (step S146). The processing is ended (step S150).

When the QR-code ID is registered, the QR-code management server 3 transmits the use count to the multi-function peripheral 4 (step S147). When the received use count is below zero, the multi-function peripheral 4 displays on the operation panel a message indicating that no limit use of the cover page C is possible (step S148). And the processing is ended (step S150).

When the received use count is above 1, the multi-function peripheral 4 displays on the operation panel the use count (step S149). And the processing is ended (step S150).

Figure 44:
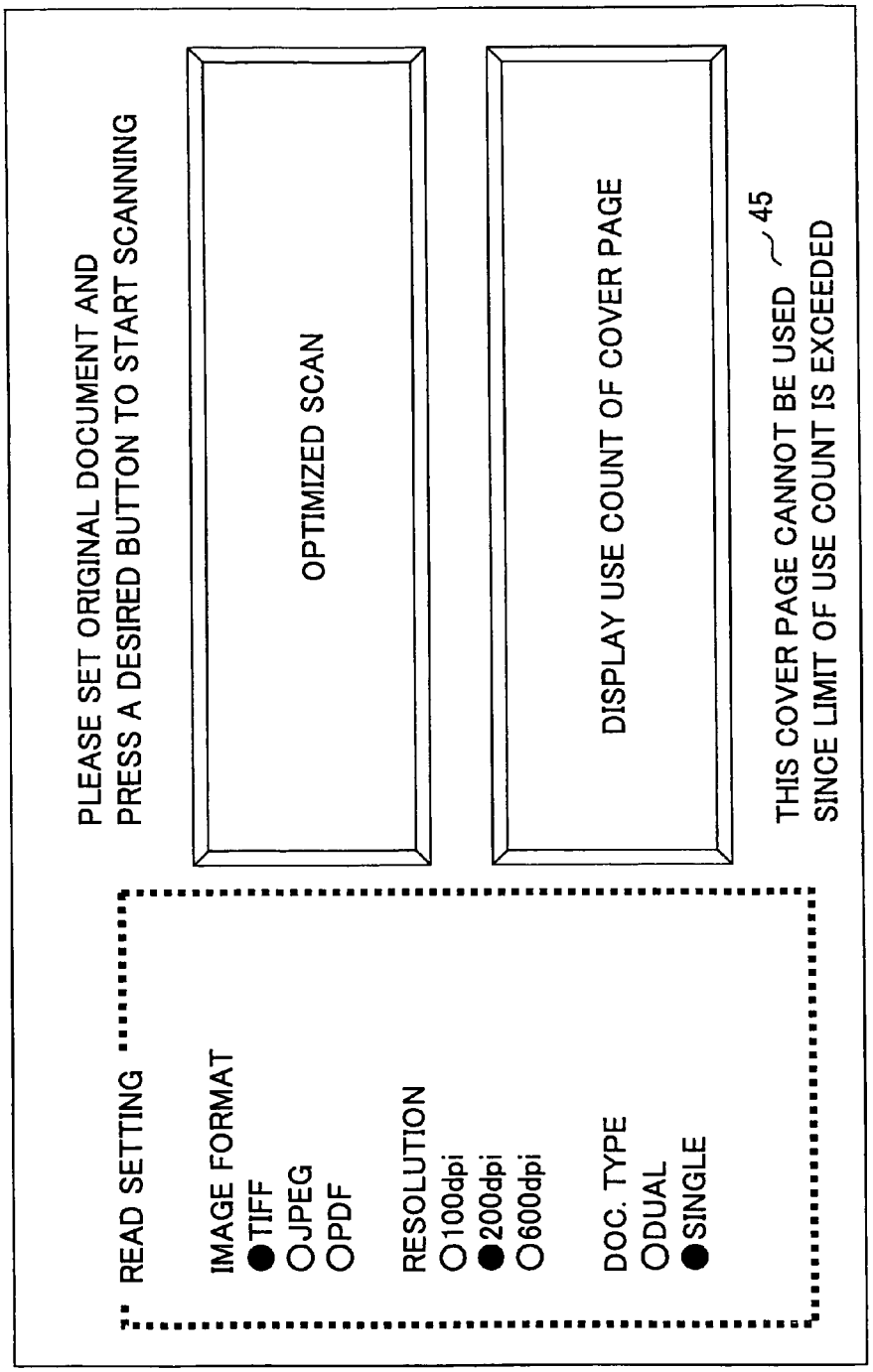
FIG. 44 is a diagram showing an example of the display of the use count.

FIG. 44 shows an example of the display of the use count. In the example of FIG. 44, the indication 45 "this cover page cannot be used since the limit of the use count is exceeded" is displayed.

The present invention is not limited to the above-described embodiments, and variations and modifications may be made without departing from the scope of the present invention.

Further, the present application is based on and claims the benefit of priority of Japanese patent application No. 2005-164417, filed on Jun. 3, 2005, and Japanese patent application No. 2006-138188, filed on May 17, 2006, the entire contents of which are hereby incorporated by reference.

What is claimed is:

1. A document-management system which supports a task of electronizing paper documents and registering electronic data of the documents in collaboration with an existing conference management system, the existing conference management system having a user interface provided to register electronic data, the document-management system comprising:
   a code management server including
      a request receiving unit receiving a code assignment request from a user;
      a code generating unit generating a site identifying code identifying the registration site of the existing conference management system after the code assignment request is received; and
   a user terminal including
      a screen generating unit generating and displaying a user interface screen corresponding to an electronic-data registration site of the existing conference management system permitting to send the code assignment request, and displaying the user interface screen including an image of the site identifying code, the site identifying code is superimposed on the user interface screen corresponding to the registration site of the existing conference management system, the screen provided for the user to print an automatic registration request page including the site identifying code which is scanned simultaneously with scanning of the paper documents,
   wherein the request receiving unit provides the code assignment request to the code management server, and the screen code generating unit provides to the user terminal processed HTML data in which a link to the image of the site identifying code is included as HTML of the user interface screen of the existing document conference management system.

2. The document-management system according to claim 1 wherein the request receiving unit and the screen generating unit use a bookmarklet registered in a Web browser of the user terminal as a bookmark in the user interface screen, and when the bookmark is clicked, the link to the image of the site identifying code is included as HTML of the user interface screen.

3. The document-management system according to claim 1, wherein the code generating unit is configured to generate, when a code image acquisition request is received from the user terminal, the image of the site identifying code and to transmit the image to the user terminal.

4. The document-management system according to claim 1 wherein the site identifying code is managed in a database in which an ID of the site identifying codes and a site locator of the user interface screen are associated and registered.

5. The document-management device according to claim 1 wherein the request receiving unit is configured to receive cookie information of the user interface screen which is used as authentication information of the existing conference management system.

6. The document-management system according to claim 5 wherein the cookie information is managed in a database in which an ID of the site identifying code, a site locator of the user interface screen, and the cookie information are associated and registered.

7. The document-management system according to claim 1 wherein the screen generating unit is configured to generate the processed HTML data in which a description of a button for selecting an expiration date for the request page, and a description of transmitting of a selected expiration date are included as HTML of the user interface screen of the existing conference management system.

8. The document-management system according to claim 7 wherein the expiration date is managed in a database in which an ID of the site identifying code, the expiration date, and a site locator of the user interface screen are associated and registered.

9. The document-management system according to claim 1 wherein the screen generating unit is configured to generate the processed HTML data in which a description of a button for selecting a use count for the request page, and a description of transmitting of a selected use count are included as HTML of the user interface screen of the existing conference management system.

10. The document-management system according to claim 9 wherein the use count is managed in a database in which an ID of the site identifying code, the use count, and a site locator of the user interface screen are associated and registered.

11. The document-management system according to claim 1 wherein the code management server which is arranged separately from the user terminal and the existing conference management system.

12. The document-management system according to claim 1 wherein the screen generating unit is provided in a multi-function peripheral having scanner and printer functions.

13. The document-management system according to claim 1 wherein the screen generating unit is provided together with the existing conference management system.

14. The document-management system according to claim 4 wherein the database, and the code generating unit are provided in the code management server which is arranged separately from the user terminal and the existing conference management system.

15. The document-management system according to claim 4 wherein the database, and the code generating unit are provided in a multi-function peripheral having scanner and printer functions.

16. The document-management system according to claim 4 wherein the database, and the code generating unit are provided in the existing conference management system.

17. The document-management system according to claim 4 wherein the database is provided in the code management server which is arranged separately from the user terminal and the existing conference management system.

18. A document-management method which supports a task of electronizing paper documents and registering electronic data of the documents in collaboration with an existing conference management system, the existing conference management system having a user interface provided to register electronic data, comprising:

displaying a user interface screen corresponding to an electronic-data registration site of the existing conference management system on a user terminal;

sending a code assignment request to a code management server by using the user interface screen at the user terminal;

receiving the code assignment request from the user terminal at the code management server;

generating a site identifying code identifying the registration site of the existing conference management system at the code management server, after the code assignment request is received;

sending the site identifying code from the code management server to the user terminal, by sending to the user terminal processed HTML data in which a link to an image of the site identifying code is included as HTML corresponding to the user interface screen of the existing conference management system;

generating and displaying a screen at the user terminal including the image of the site identifying code, the site identifying code is superimposed on the user interface screen corresponding to the registration site of the existing conference management system, the screen provided for the user to print an automatic registration request page including the site identifying code which is scanned simultaneously with scanning of the paper documents.

19. A document-management client device which supports a task of electronizing paper documents and registering electronic data of the documents in collaboration with an existing conference management system, the existing conference management system having a user interface provided to register electronic data, the document-management client device comprising:

a request sending unit sending a code assignment request to a code management server, the code management server generating a site identifying code identifying the registration site of the existing conference management system after the code assignment request is received;

a data receiving unit receiving at the client device processed HTML data in which a link to an image of the site identifying code is included as HTML corresponding to the user interface screen of the existing conference management system; and a screen generating unit generating and displaying a user interface screen corresponding to an electronic-data registration site of the existing conference management system, and displaying the user interface screen including the image of the site identifying code, the site identifying code superimposed on the user interface screen corresponding to the registration site of the existing conference management system, the screen provided for the user to print an automatic registration request page including the site identifying code which is scanned simultaneously with scanning of the paper documents.

* * * * *